United States Patent
Chua

(10) Patent No.: US 7,236,549 B2
(45) Date of Patent: Jun. 26, 2007

(54) DIGITAL SWITCHING WIRELESS RECEIVER DIVERSITY AND BUFFER DIVERSITY FOR ENHANCED RECEPTION IN A WIRELESS DIGITAL AUDIO COMMUNICATION SYSTEM

(75) Inventor: Beng Huat Chua, Singapore (SG)

(73) Assignee: FreeSystems Pte. Ltd, Singapore (SG)

( * ) Notice: Subject to any disclaimer, the term of this patent is extended or adjusted under 35 U.S.C. 154(b) by 825 days.

(21) Appl. No.: 10/613,597

(22) Filed: Jul. 3, 2003

(65) Prior Publication Data

US 2005/0002480 A1 Jan. 6, 2005

(51) Int. Cl.
H04L 1/02 (2006.01)
(52) U.S. Cl. ..................................... 375/347
(58) Field of Classification Search ........... 375/240.27, 375/267, 299, 347; 455/500, 526
See application file for complete search history.

(56) References Cited

U.S. PATENT DOCUMENTS

| | | | | |
|---|---|---|---|---|
| 4,517,669 | A | 5/1985 | Freeburg et al. ............... | 370/82 |
| 5,073,900 | A | 12/1991 | Mallinckrodt ................. | 375/1 |
| 5,325,403 | A * | 6/1994 | Siwiak et al. ................ | 375/347 |
| 5,799,042 | A | 8/1998 | Xiao ........................... | 375/285 |
| 6,088,407 | A | 7/2000 | Buternowsky et al. ...... | 375/347 |
| 6,181,749 | B1 | 1/2001 | Urabe et al. ................. | 375/267 |
| 6,185,258 | B1 | 2/2001 | Alamouti et al. ........... | 375/260 |
| 6,272,190 | B1 | 8/2001 | Campana, Jr. ............... | 375/347 |
| 6,351,630 | B2 | 2/2002 | Wood, Jr. .................... | 455/101 |
| 6,728,919 | B1 * | 4/2004 | Kondo et al. ................ | 714/751 |
| 2002/0159505 | A1 * | 10/2002 | Hayashibara ............... | 375/147 |

FOREIGN PATENT DOCUMENTS

| | | |
|---|---|---|
| JP | 1265739 | 10/1989 |
| JP | 4008031 | 1/1992 |

OTHER PUBLICATIONS

"Cochannel Interference Suppression Through Time/Space Diversity", A.R. Calderbank et al., IEEE Trans. on Info Theory, vol. 46, No. 3, May 2000, pp. 922-932.
Interference Cancellation using Antenna Diversity for EDGE—Enhanced Data Rates in GSM and TDMA/136, Bladsjo et al., Proc. Vehicular Tech. Conf., 1999, vol. 4, pp. 1956-1960.

* cited by examiner

*Primary Examiner*—Emmanuel Bayard
*Assistant Examiner*—Lawrence Williams
(74) *Attorney, Agent, or Firm*—Saile Ackerman LLC; Stephen B. Ackerman; Billy Knowles

(57) ABSTRACT

A diversity receiver system applying diversity to improve reception of coded data in presence of fading of the broadcast signal. The communication system includes a diversity receiver system receiving the coded data modulated broadcast signal from a transmission channel. The diversity receiver system has a signal acquisition device for evaluation of the signal characteristics of copies of the coded data modulated broadcast signal, extracting the coded data, control signals, and locking signals from the copies of the coded data. A diversity circuit selects one of the copies of the coded data modulated broadcast signals. An error evaluation circuit evaluates the coded data signal for errors and provides an error signal to the diversity circuit indicating an error state of the selected data, wherein the diversity circuit selects a second copy of the coded data modulated broadcast signal.

54 Claims, 14 Drawing Sheets

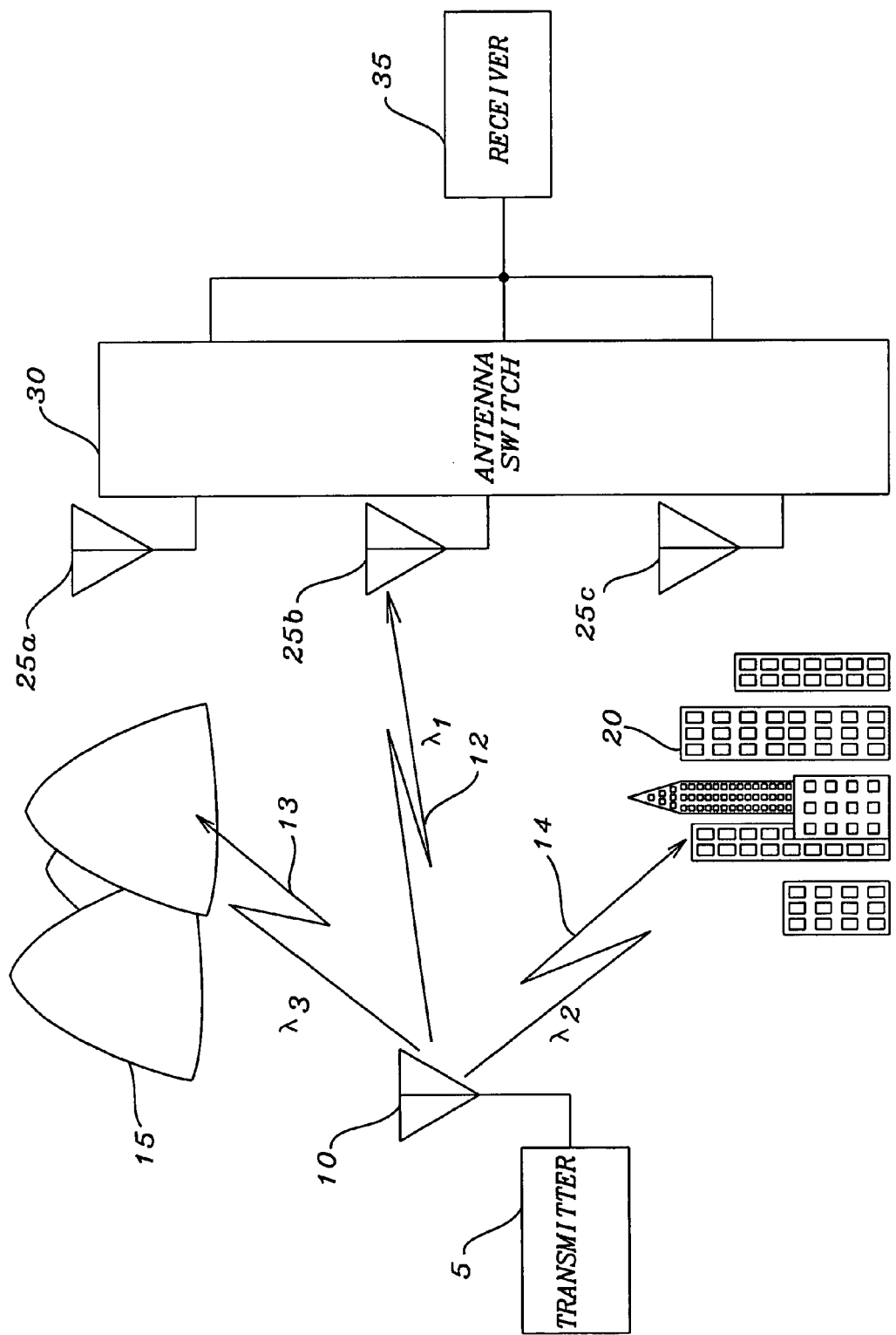
FIG. 1a – Prior Art

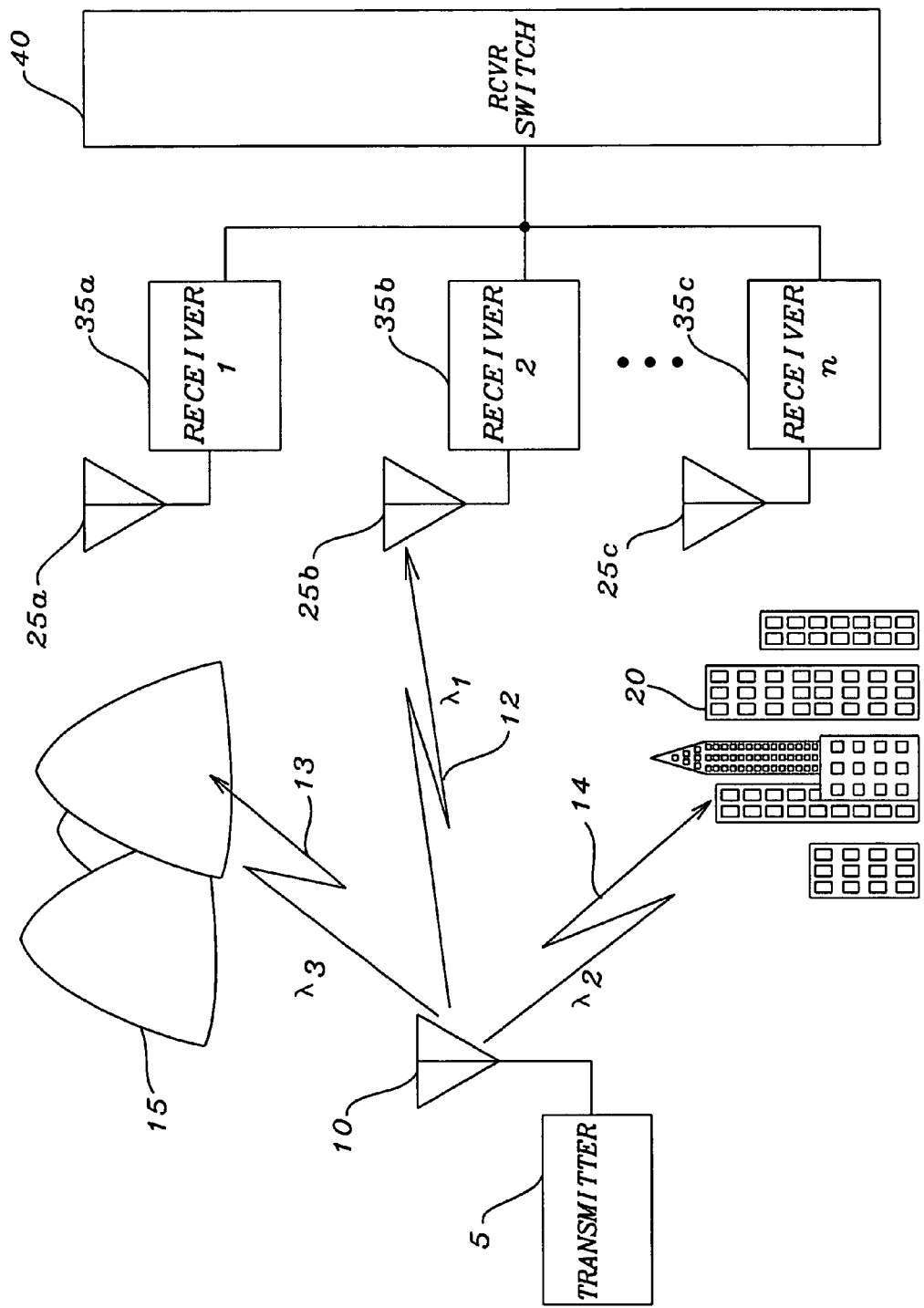
FIG. 1b – Prior Art

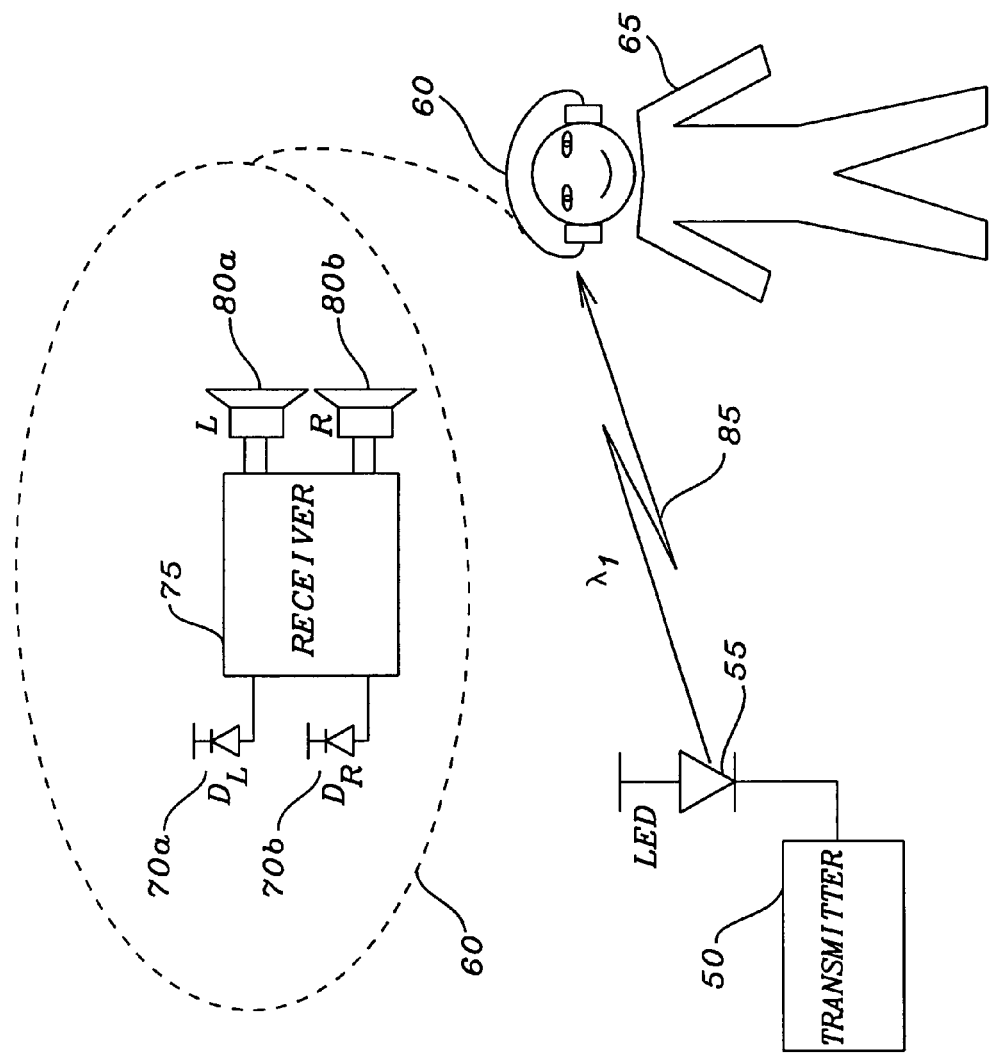
FIG. 2 – Prior Art

DIGITAL SWITCHING WIRELESS RECEIVER DIVERSITY AND BUFFER DIVERSITY FOR ENHANCED RECEPTION IN A WIRELESS DIGITAL AUDIO COMMUNICATION SYSTEM

BACKGROUND OF THE INVENTION

1. Field of the Invention

This invention relates to methods and apparatus for the transmission and reception of the broadcast signals modulated with encoded data. More particularly this invention relates to methods and apparatus for reception of broadcast signals modulated with encoded data employing receiver diversity and time diversity techniques.

2. Description of Related Art

Diversity techniques are well known in the art to insure the quality of reception in an environment where the broadcast signals are fading. Transmitter diversity employs multiple antennas or multiple transmitters coupled to multiple antennas to broadcast signals such that a receiver is more likely to receive one of the signals.

In receiver diversity, multiple antennas or multiple antennas coupled to multiple receivers are employed to receive the broadcast signal. In the fading channel, the likelihood that one of the receivers will capture the broadcast signal justifies the expense of additional antennas and receivers.

Refer now to FIGS. 1a and 1b for a review of receiver diversity of the prior art. In FIG. 1a, the transmitter 5 modulates a transmit signal such as an RF frequency with a data signal and transfers the modulated transmit signal to a transducer such as the antenna 10. The antenna 10 radiates a broadcast signal that results from the modulated transmit signal. The broadcast signal as is known is a wave front of electromagnetic energy shown here as separate broadcast signals 12, 13, and 14. Geographic obstacles such as mountains and hills 15 and buildings 20 may block or reflect the broadcast signals 12, 13, and 14 such that the amount of energy arriving at any of the antennas 25a, 25b, 25c is not sufficient to be detected by the receiver 35. If there were just one antenna, then any of the broadcast signals 12, 13, and 14 cannot be distinguished by the receiver. However, the multiple antennas 25a, 25b, 25c allow the antenna switch 30 to monitor the strength of the received broadcast signals 12, 13, and 14 and to select one of the antennas 25a, 25b, 25c having the strongest signal for transfer to the receiver 35. This allows the receiver 35 to have the highest quality signal to process to extract the received information.

In FIG. 1b, the transmitter 5 similarly modulates a transmit signal such as an RF frequency with a data signal and transfers the modulated transmit signal to a transducer such as the antenna 10. The antenna 10 radiates a broadcast signal that results from the modulated transmit signal. The broadcast signal, as is known, is a wave front of electromagnetic energy shown here as separate broadcast signals 12, 13, and 14. The geographic obstacles such as the mountains and hills 15 and the buildings 20 similarly may block or reflect the broadcast signals 12, 13, and 14. In this example, the antennas 25a, 25b, 25c are coupled respectively to the receivers 35a, 35b, 35c. Dependent upon the strength of the broadcast signals 12, 13, and 14 any of the antennas 25a, 25b, 25c may not have sufficient for detection by its respective receiver 35a, 35b, 35c. As in the previous example, if only one antenna and receiver existed and it was blocked from receiving the broadcast signals 12, 13, and 14, the receiver would not be able to recover the data signal. All the receivers 35a, 35b, or 35c are connected to the receiver switch 40, which dependent upon the quality of the received and recovered signal switches selects the receiver 35a, 35b, 35c having the best recovered data signal.

The examples of FIGS. 1a and 1b illustrate a wireless radio frequency (RF) application for diversity. Refer now to FIG. 2 for an example of receiver diversity as applied to a wireless infrared application for digital audio headphones. The transmitter 50 is provided digitally encoded audio signals. The transmitter 50 formats the digitally encoded audio signals with synchronization, control, and error signals. The formatted encoded data modulates a transmit signal similar to the RF wireless, except in this case the signal may be pulse positioned modulated rather than frequency shift keyed as in RF wireless. The modulated signal is used to control the radiation of a light signal from the light emitting diode (LED) 55. The light signal 85 is broadcast to the headphones 60. The headphones 60 have at least two photodetectors 70a and 70b. The photodetectors 70a and 70b are generally placed on the outer sides of the headphones 60 to receive the light signal 85. The detected electrical signals of the photodetectors 70a and 70b are transferred to the receiver 75, which demodulates and reformats the encoded audio signals for transfer to the speakers 80a and 80b. The speakers 80a and 80b are placed in close proximity to the ears of the person 65 wearing the headphones 60. If the system had only one photodetector 70a or 70b, the light signal 85 would be not be detectable if the photodetector 70a or 70b was not pointed essentially directly at the LED transmitter 55. Having two photodetectors 70a and 70b allows the receiver to always have detected electrical signals. The photodetectors 70a and 70b maybe selected by a switch that which of the photodetectors 70a or 70b has sufficient signal for detection. Alternately, there, in fact, may be two receivers with a selection circuit determining which receiver transfers the received audio to the speakers 80a and 80b.

A technique commonly referred to as time diversity employs interleaving of the encoded data and error correction coding to insure that the received digital audio signals are recovered. The interleaving separates contiguous data packets of the digital audio and transfers them at non-contiguous times. This allows for errors to occur within the encoded data and to the encoded data to be recovered when the received digital audio data is rearranged to de-interleave the data packets and then have error detection and correction performed on the received data. Thus even marginally received broadcast signals can be successfully received and the data recovered.

U.S. Pat. No. 6,351,630 (Wood, Jr.) describes a wireless communications system having transponder coupled to one of multiple selectable antennas. A look-up table holds data representing antennas, and having pointers to define an order in which antennas will be used to attempt communication with second transponder U.S. Pat. No. 6,272,190 (Campana, Jr.) provides a system and method for wireless transmission and receiving of information. The method includes transmitting data and then after a time delay retransmitting the data. The data for each transmission contains an error correction code. Upon receiving the first and second data transmissions, the data is processed to identify, by use of the error correction code, erroneous data within at least one of the data transmissions. The identified erroneous data is replaced with non-erroneous data from the other data transmission.

U.S. Pat. No. 6,185,258 (Alamouti, et al.) teaches a transmitter diversity technique for wireless communications. A simple block coding arrangement is created with symbols transmitted over a plurality of transmit channels. The diversity created by the transmitter utilizes space diversity and either time or frequency diversity.

U.S. Pat. No. 6,181,749 (Urabe, et al.) details a diversity receiver. A demodulator obtains modulated data to a number of channels. The channels have subband filters and differential detectors for demodulating the data. Error estimating circuits estimate and output the numbers of erroneous symbols and error locations for each channel. A data comparator compares the demodulated data corresponding to the error locations with the demodulated data in the corresponding locations in other channels to determine whether the error location is correct. The data comparator provides a decision signal in response to the determination. A data selector selects one of the demodulated data from the channels on the basis of the numbers of erroneous symbols and the decision signals and outputs the data as selected data.

U.S. Pat. No. 6,088,407 (Buternowsky, et al.) describes a digital diversity receiver system employing one or more transmitters, a plurality of receivers, and at least one two-way personal paging unit or pager. The two-way pager receives pages from the transmitter, and sends response signals, which are detected by the receivers. A microdiversity receiver is described as two receiver components provided at a single receiver site, with a separate antenna for each receiver component. Signals as received at the different receivers can be compared and have the accuracy indication information combined to increase the reliability of the system in detecting and decoding the pager response symbols.

U.S. Pat. No. 5,799,042 (Xiao) describes a wireless digital communication systems that apply an antenna diversity scheme to combat fading in a received radio system having a single receiver front-end comprises a simple and robust antenna diversity scheme. Radio signals transmitted to the receiving antennas has redundant information for allowing error correction at reception side.

U.S. Pat. No. 5,073,900 (Mallinckrodt) provides a cellular communications system is provided using spread spectrum system with code division multiple access (CDMA), and employing forward error correction coding (FECC) to enhance the effective gain and selectivity of the system. A digital data interleaving feature reduces fading.

U.S. Pat. No. 4,517,669 (Freeburg, et al.) describes a method and apparatus for coding messages communicated between a primary station and remote stations of a data communications system. The apparatus employs an antenna diversity scheme for a communications controller at the primary station. Variable length messages are communicated between a general communications controller (GCC) and a plurality of portable and mobile radios. The variable length messages include a bit synchronization field, a message synchronization field and a plurality of channel data blocks for efficiently and reliably handling long strings of data or text. Each channel data block includes an information field, a parity field for error-correcting the information field and a channel state field indicating whether or not the radio channel is busy or free.

Japanese Patent Laid-Open No. 4-8031 JP4008031 (Hiroyuki) describes a reception diversity system, which generates an error correcting signal indicating the correction every time received data is corrected. The error correcting signal is sent to an error correcting signal comparator, which counts the error correcting signal compares the signals from multiple receivers to decide which receiver is providing the best quality reception.

Japanese Patent Laid-Open No. 1-265739 (Kiyoyuki, et al.) provides a system for minimizing the effect of reception level fluctuation and phase fluctuation due to fading. The transmitter sends transmission information encoded with error detection and correction codes. The receiver decodes the received information by plural antennas. The system performs an error detection and correction on the received information and based on the amount of errors present in the received information selects the received information from the antenna with least error among the received information sets from each of the antennas.

"Cochannel Interference Suppression Through Time/Space Diversity," Calderbank, et al., IEEE Transactions on Information Theory, May 2000, Volume: 46, Issue: 3, pp. 922-932 discusses wireless systems that are subject to a time-varying and unknown a priori combination of cochannel interference, fading, and Gaussian noise. The wireless systems discussed provide diversity in time by channel coding.

"Interference Cancellation Using Antenna Diversity for EDGE-Enhanced Data Rates in GSM and TDMA/136," Bladsjo et al., Proceeding Vehicular Technology Conference, 1999, pp. 1956-1960, vol.4, discusses the evaluation of EDGE (enhanced data rates for global evolution). The paper further discusses antenna diversity, which enables interference-cancellation methods.

SUMMARY OF THE INVENTION

An object of this invention is to provide a communication system for transmitting and receiving a broadcast signal modulated with coded data.

Another object of this invention is to provide a communication system applying diversity to improve reception of coded data in presence of fading of the broadcast signal.

To accomplish at least one of these and other objects, a communication system includes a transmitter and diversity receiver. The transmitter acquires input data, appends an error coding and a locking signal to the input data to form the coded data. The transmitter then modulates the broadcast signal with the coded data, and propagates the broadcast signal through a transmitting transducer. The transmitting transducer maybe an antenna or a light emitting diode.

The diversity receiver system receives the coded data modulated broad cast signal from a transmission channel. The transmission channel is characterized by multiple transmission paths having variable transmission times and variable attenuation characteristics causing multiple copies of the coded data modulated broadcast signal. The diversity receiver system has a signal acquisition device in communication with the transmission channel for reception of the multiple copies of the coded data modulated broadcast signal. The signal acquisition device evaluates signal characteristics of one or more copies of the multiple copies of the coded data modulated broadcast signal, extracts the coded data, control signals, and locking signals from the one or more copies of the multiple copies of the coded data. A diversity circuit is in communication with the signal acquisition device to receive the signal characteristics and the coded data, the control signals, and locking signals, the diversity circuit selecting from the signal characteristics, the control signals, and the locking signals, one of the copies of the coded data modulated broadcast signals. The diversity receiver has an error evaluation circuit in communication with the diversity circuit to receive the coded data from the selected copy of the coded data modulated broadcast signal. The error evaluation circuit evaluates the coded data signal for errors and providing an error signal to the diversity circuit indicating an error state of the selected data, wherein the diversity circuit selects a second copy of the coded data modulated broadcast signal.

The signal acquisition device includes a plurality of receiving transducers, such as antennas or photodiodes, such as antennas or photodiodes, in communication with the transmission channel. Each transducer acquires one of the copies of the coded data modulated broadcast signal from the transmission channel and converting the copy of the coded data modulated broadcast signal to a received electrical signal. The received electrical signal varies in magnitude dependent upon the transmission time and variable attenuation characteristics of the transmission channel. In a first embodiment, the signal acquisition device has a plurality of receivers. Each receiver is in communication with one of the receiving transducers to amplify and condition the electrical signal and to extract the coded data, control signals, and locking signals from the received electrical signal.

Each of the plurality of the receiving transducers is assigned a selection priority such that the receiver in communication with a receiving transducer of a highest priority is selected by the diversity circuit. If the error signal indicates the selected data is in error, the diversity circuit determines another receiver having a valid locking signal and transfers the data of the receiver to the error evaluation circuit. Alternately, if the error evaluation circuit indicates the selected data is in error but is correctable, the error evaluation circuit corrects the selected data.

A second embodiment of the signal acquisition device has a plurality of receiving transducers, such as antennas or photodiodes, in communication with the transmission channel. Each transducer acquires one of the copies of the coded data modulated broadcast signal from the transmission channel and converting the copy of the coded data modulated broadcast signal to a received electrical signal. The plurality of receiving transducers is in communication with a transducer switch, which, in turn is in communication with the diversity circuit. Upon reception of a transducer selection signal from the diversity circuit the transducer switch selects one of the electrical signals of a selected receiving transducer. A receiver is in communication with the transducer switch to amplify and condition the electrical signal from selected receiving transducer and to extract the coded data, control signals, and locking signals from the received electrical signal. The error evaluation circuit transfers the coded data to the error evaluation circuit. Each of the plurality of the receiving transducers is assigned a selection priority such that the receiving transducer of a highest priority is selected by the diversity circuit. If the error signal indicates the coded data received and extracted from the electrical signal of the selected receiving transducer is in error, the diversity circuit generates the transducer selection signal to select a second electrical signal from a second receiving transducer to be transferred to the receiver, the second electrical signal then having a valid locking signal and transfers the data of the receiver to the error evaluation circuit. Alternately, if the error evaluation circuit indicates the coded data received and extracted from the electrical signal of the selected receiving transducer is in error but is correctable, the error evaluation circuit corrects the coded data received and extracted from the electrical signal of the selected receiving transducer.

The diversity receiver includes a data register in communication with the diversity circuit to retain the coded data received and extracted from the electrical signal of the selected receiving transducer and in communication with the error evaluation circuit so that the error evaluation circuit can retrieve the coded data. A de-interleaving circuit in communication with the diversity circuit to organize the selected data such that the coded data received and extracted from the electrical signal of the selected receiving transducer is in a contiguous order prior to transfer to the error evaluation circuit.

BRIEF DESCRIPTION OF THE DRAWINGS

FIGS. 1a and 1b are diagrams illustrating the concept of receiver diversity for a wireless RF communication system of the prior art.

FIG. 2 is a diagram illustrating the concept of receiver diversity for a wireless infrared communication system of the prior art.

DETAILED DESCRIPTION OF THE INVENTION

Figure 3:
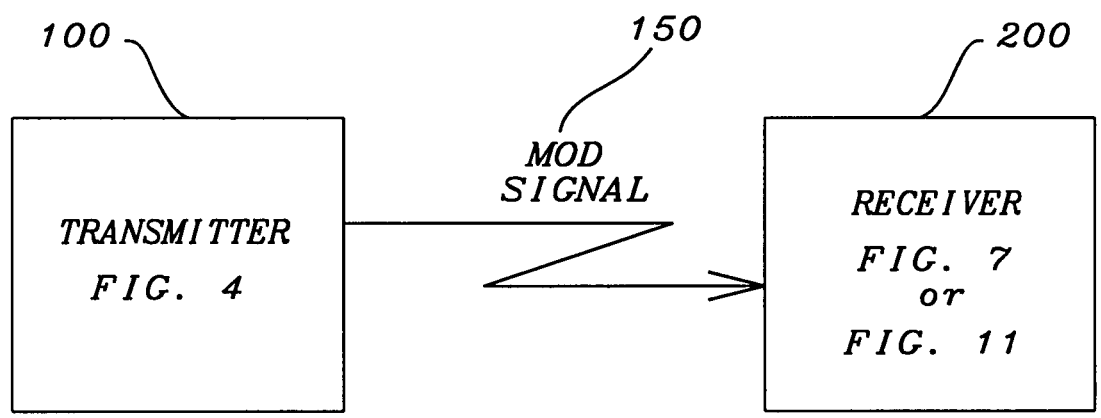
FIG. 3 is block diagram of a communication system employing diversity reception of this invention.

The communication system of this invention, as shown in FIG. 3, has a transmitter 100 and a diversity receiver 200. The transmitter 100 acquires input data and appends an error coding and a locking signal to the input data to form encoded data frame. The transmitter 100 then modulates the broadcast signal with the coded data frame, and propagates the broadcast signal 150 through a transmitting transducer, such as an antenna or light emitting diode.

The diversity receiver 200 acquires the modulated broadcast signal 150 through multiple receiving transducers. The receiving transducers 200 may include antennae for receiving RF broadcast signals or photodiodes for receiving light broadcast signals. The diversity receiver then extracts the encoded data frame, acquires the locking signal to extract the digital data.

In a first embodiment, the diversity receiver has multiple receiver circuits each coupled to the receiving transducers. The extracted digital data is de-interleaved. An error detection and correction is performed the de-interleaved digital data and the receiving circuit providing correct digital data is selected for reception of the digital data. The diversity circuit monitors reception of each encoded data frame for control signals and locking signal and the ability to detect and correct errors and transfers the reception to the receiver circuit capturing the locking signal and either capturing the correct digital data or correcting the captured digital data.

In a second embodiment, the diversity receiver has a transducer switch coupled to each of the multiple transducers. The transducer switch is coupled to one receiver circuit. A select signal determines which of the multiple transducers is to be connected through the transducer switch to the receiver circuit. As in the first embodiment, the diversity circuit monitors reception of each encoded data frame for control signals and locking signal and the ability to detect and correct errors. In the second embodiment the diversity generates the control signal for the transducer switch and transfers the transducer providing the modulated broadcast signal that allows for capturing the control signals, the locking signal and either capturing the correct digital data or correcting the captured digital data.

The transducers may be provided a selection priority that ensures that a certain transducer is selected initially. The transducer or receiver selection priority is modified by the diversity circuit to ensure that the selection a transducer or receiver ensures capturing the correct digital data or at least capturing correctable digital data.

Figure 4:
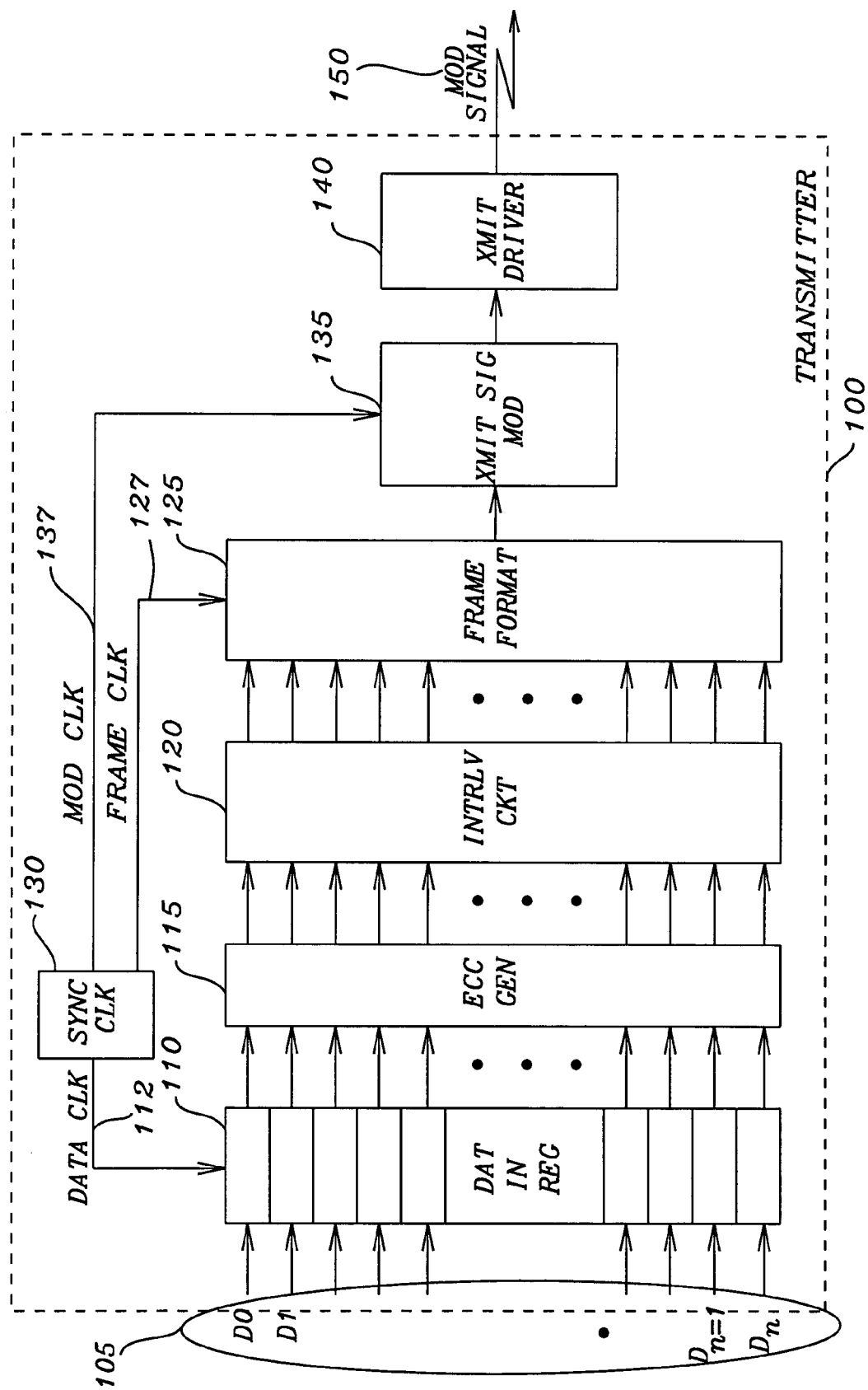
FIG. 4 is block diagram of a transmitter of the communication system of this invention.

Refer now to FIG. 4 for a discussion of the operation of the transmitter 100. The transmitter 100 acquires the digital data 105 to be transmitted. The digital data 105 may, for example, be the digitally encoded audio signals such as provided by compact disk read only memory. The digital data 105 is received and retained by the data input register 110. A data clock signal 112 from the synchronization clock circuit 130. An error correction code generator 115 extracts the digital data from the data input register 110 and creates an error correction code that is to be appended to the digital data. The digital data with the appended error correction code is transferred to the interleave circuit 120. The interleave circuit 120 rearranges the order of the data segments (bytes or words) to separate contiguous data segments. This insures that these data segments will be transmitted in non-sequential order to be separated in time such that the likelihood of errors destroying the digital data is minimized.

The interleaved digital data is then transferred to the frame format circuit 125. The frame format circuit 125 will serialize the data and concatenate a locking signal to the serialized data to form an encoded data frame to be transmitted. The locking signal has a synchronization signal, which is used by the receiver to synchronize its oscillator to the synchronization clock 130 of the transmitter 100. Additionally, the locking signal has a start signal that indicates the beginning of the serialized digital data. The locking signal may optionally have a stop signal indicating the ending of the serialized digital data.

Figure 6:
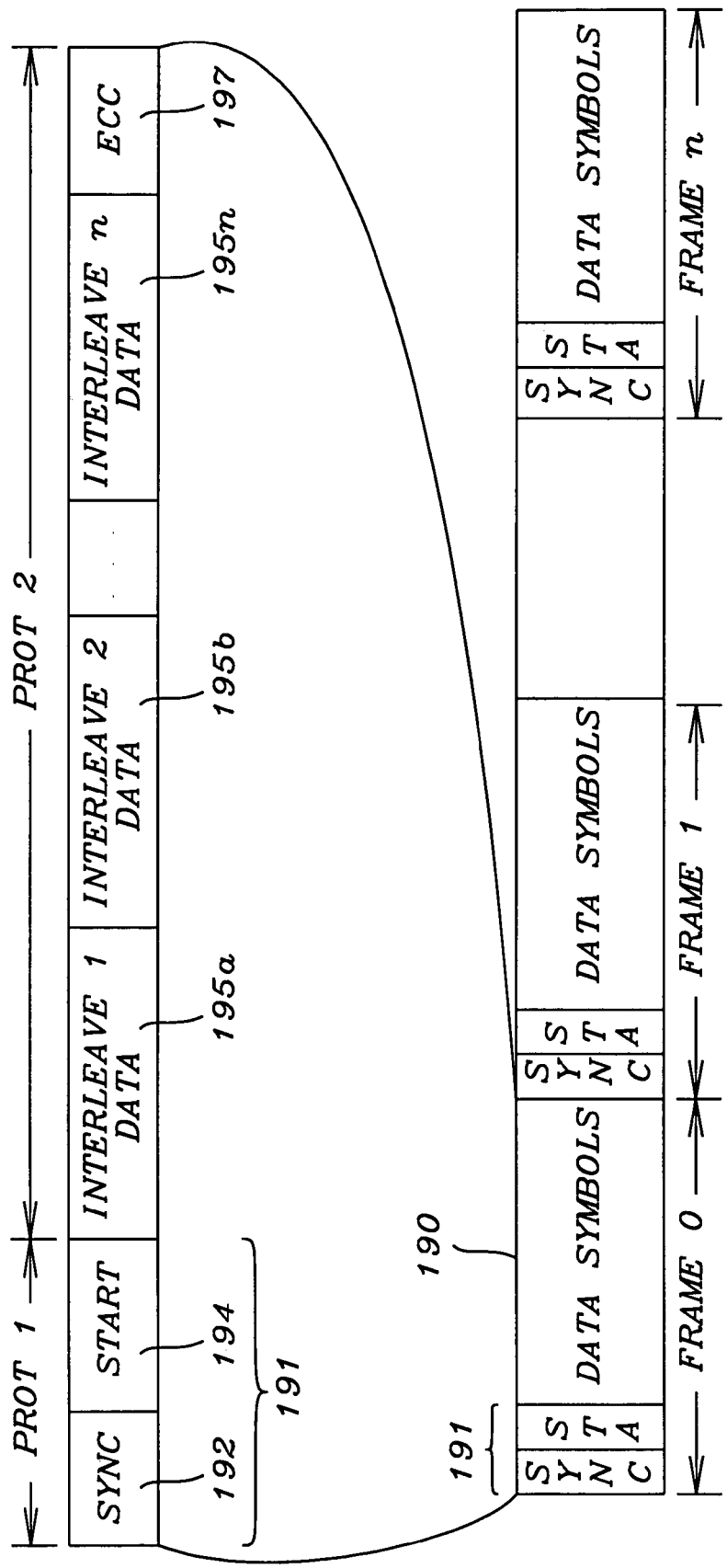
FIG. 6 is a diagram illustrating the format of the encoded data of this invention.

The format of the encoded digital data frame is shown in FIG. 6. A digital data frame 190 consists of the locking signal 191. The locking signal 191 includes the synchronization signal 192 and the start signal 194. The optional stop signal (not shown) indicates the ending message of the encoded data frame. The data interleaves 195a, 195b, and 195n are then serially concatenated after the locking signal 191. The encoded digital data frames are then serially joined to form the transmission.

The serialized encoded data is then conveyed to the transmit signal modulator 135. The transmit signal modulator 135 combines the encoded data with a fundamental no signal to form a modulated transmit signal. The transmit signal modulator 135 would use frequency shift keying for an RF signal and pulse position modulation for a light signal.

The modulated transmit signal is the input to the transmit driver 140. The modulated transmit signal provides the stimulus to the transmitting transducer to cause the modulated broadcast signal 150 to radiate into the environment.

Figure 5:
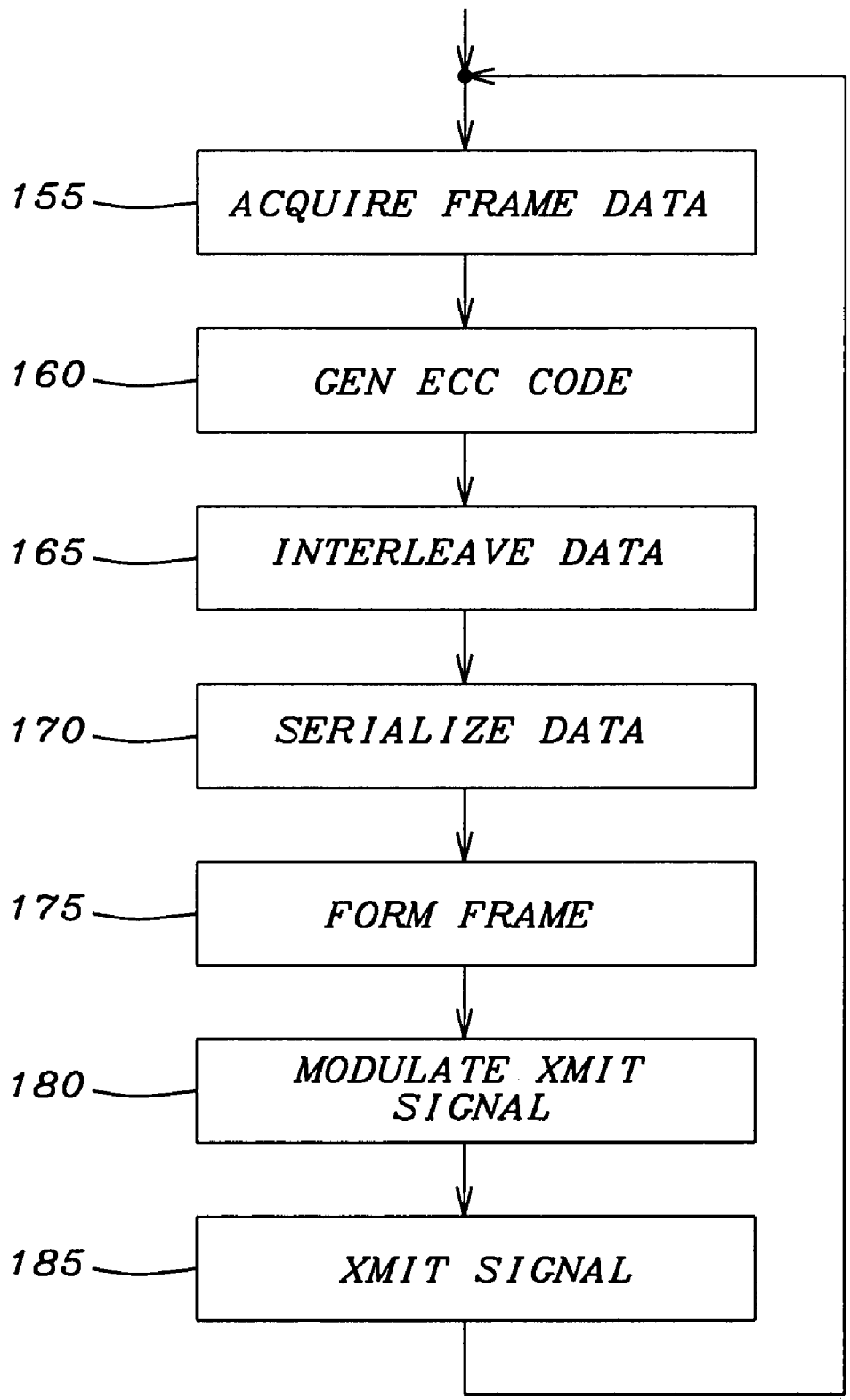
FIG. 5 is a flow chart of the method for formatting and transmitting encoded data of this invention.

As is known in the art, the transmitter 100 may include a digital signal processor. The digital signal processor, being a computing system, executes functions and processes being programs stored on data storage medium for execution by the method shown in FIG. 5. The digital frame data is acquired (Box 155) and retained. The process continues by generating an error correction code (Box 160) that is to be included with the digital frame data. The digital frame data with the included error correction code is then rearranged to interleave (Box 165) the digital frame data to separate contiguous data. As described above, this allows correction of errors that may occur to contiguous transmitted data. The digital data frames are then serialized (Box 170) and formed (Box 175) into frames by the concatenation of the locking signal to the digital frame data with the included error correction codes. The locking signal as described above includes the synchronization signal, the start signal, and the optional stop signal. The serialized data frames then modulate (Box 180) a transmit signal. The modulated transmit signal is then sent (Box 185) to a transmitting transducer for broadcast to the environment.

Figure 7:
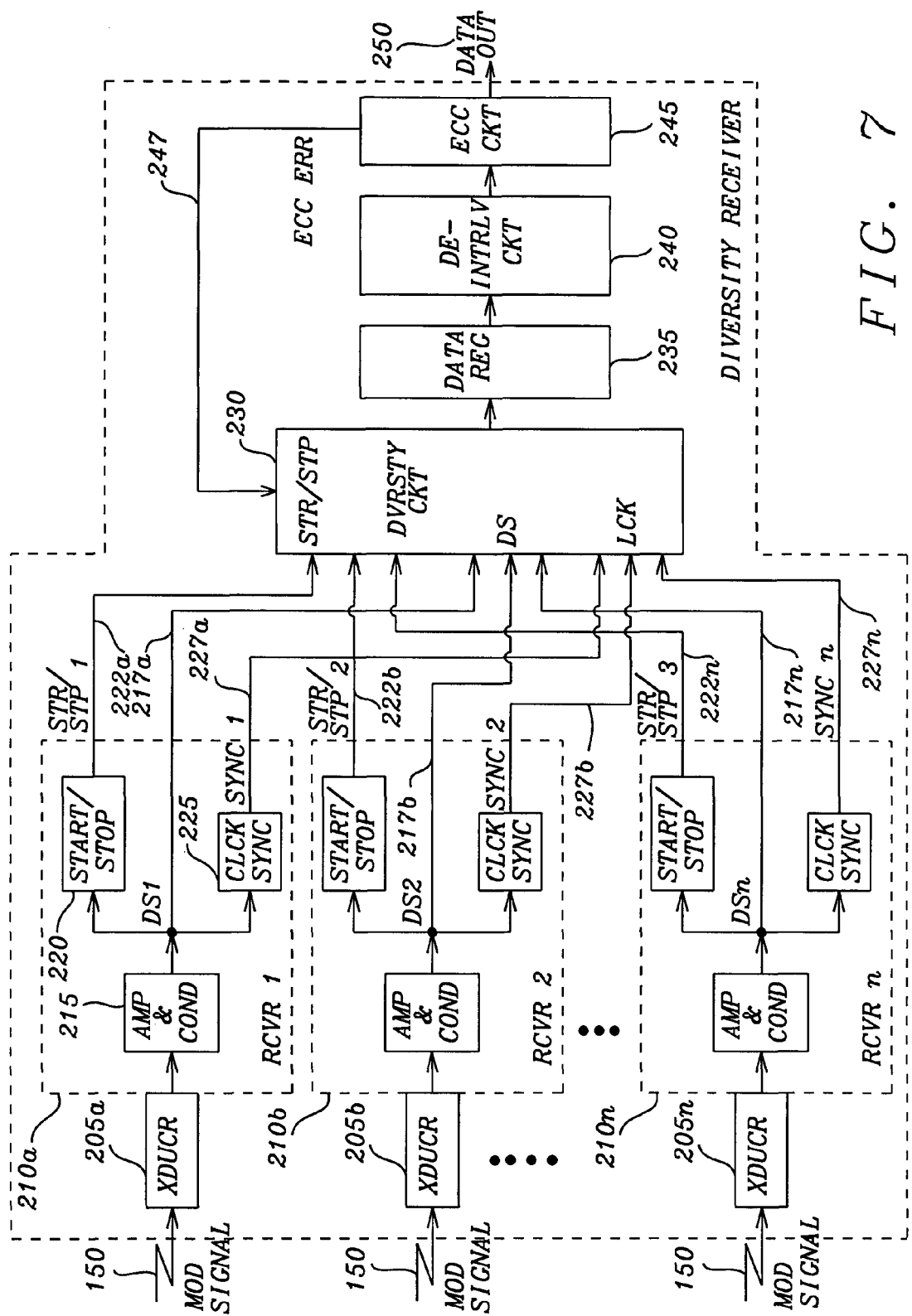
FIG. 7 is block diagram of a first embodiment of the diversity receiver of the communication system of this invention.

Referring to FIG. 7, the modulated broadcast signal 150, of the first embodiment, is acquired by a number of transducers 205a, 205b, . . . , 205n. The transducers 205a, 205b, . . . 205n are placed such that as the modulated broadcast signal 150 may be fading causing an electrical signal developed by the transducers 205a, 205b, . . . 205n to vary with the intensity of the modulated broadcast signal 150. As described in FIGS. 1b and 2, the modulated broadcast signal 150 may be blocked by geographic obstacles such as mountains, hills or buildings. These blockages cause the strength or intensity of the modulated broadcast signal 150 to vary as it arrives at each of the multiple transducers 205a, 205b, . . . 205n.

The electrical signals induced to the transducers 205a, 205b, . . . 205n are transferred to the amplification and conditioning circuit 215 within each receiver 210a, 210b, . . . 210n. The amplification and conditioning circuit 215 amplifies the electrical signal and removes the fundamental transmit signal from the electrical signal to extract the serialized encoded data. The serialized encoded data is transferred to the clock synchronization circuit 225, where the synchronization signal is detected and the receiver is synchronized to the frame clock 127 of FIG. 4. When the synchronization signal is detected a synchronization locking signal 227a, 227b, . . . 227n for each receiver 210a, 210b, . . . 210n.

The serialized encoded data is also transferred to the start/stop circuit 220. The start/stop circuit 220 examines the serialized encoded data to detect the start signal within each frame of the encoded data. When the start signal is detected, the start/stop circuit 220 of each receiver 210a, 210b, . . . 210n provides a start signal 222a, 222b, . . . 222n indicating the beginning of the interleaved digital data with the included error correction code. The combination of the synchronization locking signal 227a, 227b, . . . 227n and the start signal 222a, 222b, . . . 222n are combined to form the lock signal as described above.

The data stream of the serialized encoded data 217a, 217b, . . . 217n and the lock signal (synchronization locking signal 227a, 227b, . . . 210n and start signal 222a, 222b, . . . 222n) for each receiver 210a, 210b, . . . 210n are the input signals for the diversity circuit 230. The diversity receiver searches each lock signal from each receiver 210a, 21b, . . . 210n to determine that the receiver is synchronized to the transmitted synchronization locking signal and has detected the start signal. If all receivers 210a, 210b, . . . 210n have a lock signal, the diversity circuit 230 chooses one of the receivers 210a, 210b, . . . 210n having a highest priority value to provide the data stream of the serialized encoded data 217a, 217b, . . . 217n. If the receiver 210a, 210b, . . . 210n having the highest priority value chosen does not have a lock signal, the priority value for the receiver is lowered and a next receiver 210a, 210b, . . . 210n with the highest priority value is chosen until a lock signal is present.

Figure 8:
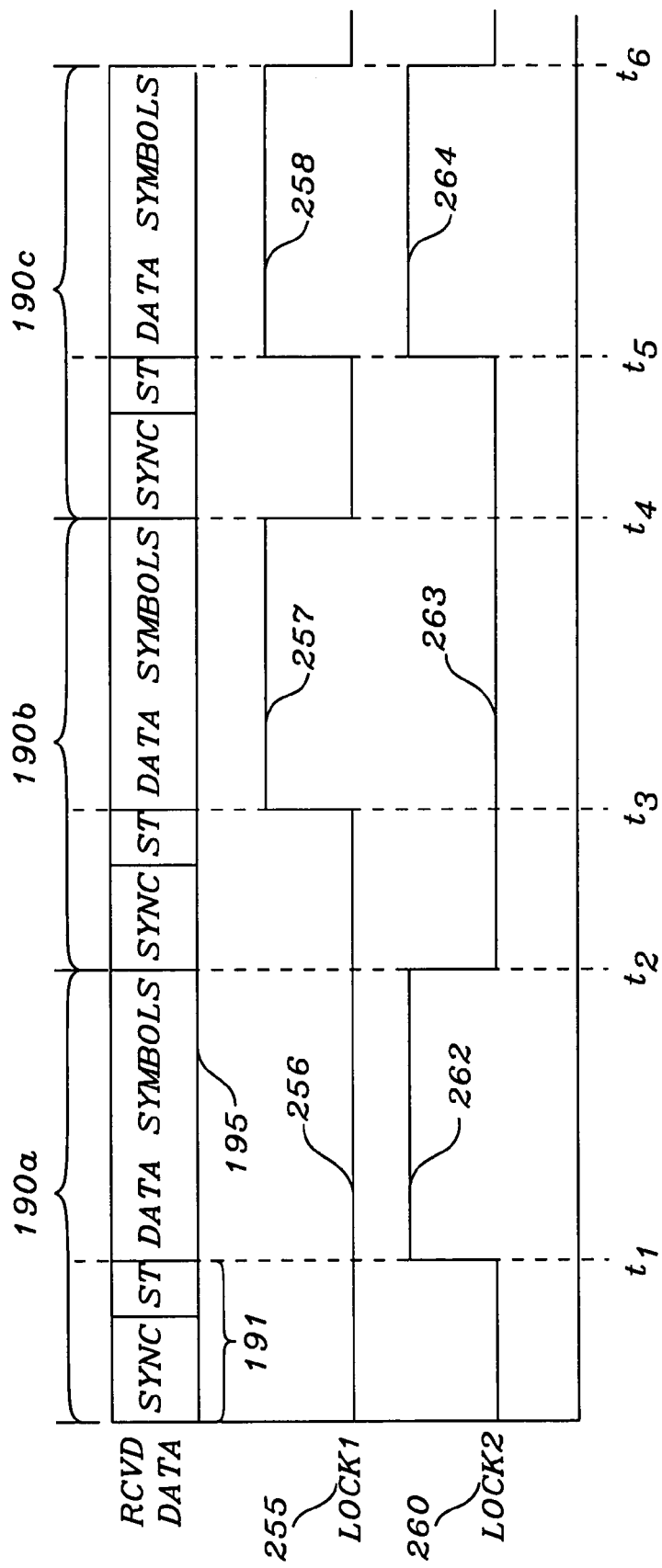
FIG. 8 is a timing diagram illustrating the lock detection of the receiver circuits of the diversity receiver of this invention.

Refer to FIG. 8 for a review of the function of the lock signal. The lock signals 255 is shown as a combination of the synchronization locking signal 227a, and the start signal 222a from receiver 1 210a and the lock signal 260 is shown as a combination of the synchronization locking signal 227b, and the start signal 222b from receiver 2 210b. The received serialized encoded data 190a, 190b, . . . 190c consists of the locking signal 191, which includes the synchronization signal 192 and the start signal 194, and the encoded data symbols 195. If the receiver 1 210a is not able to acquire either the synchronization signal or the start signal, the locking signal 255 remains at a zero level from the time $t_1$ to the time $t_2$. Meanwhile, if the receiver 2 210b is able to acquire both the synchronization signal and the start signal, the locking signal 260 changes to logical (1) level from the time $t_1$ to the time $t_2$ indicating the receiver lock. If during the reception time of the encoded data 190b, the receiver 2 210b is not able to acquire either the synchronization signal or the start signal, the locking signal 260 remains at a zero level from the time $t_3$ to the time $t_4$. Meanwhile, if the receiver 1 210a is able to acquire both the synchronization signal and the start signal, the locking signal 255 changes to logical (1) level from the time $t_3$ to the time $t_4$ indicating the receiver lock. Finally, if during the reception time of the encoded data 190c, the receiver 1 210a and receiver 2 210b both acquire the synchronization signal and the start signal, the locking signals 255 and 260 change to a logical (1) level from the time $t_5$ to the time $t_6$ indicating both the receiver 1 210a and receiver 2 210b are locked.

Once the lock signal is present at the receiver 210a, 210b, . . . 210n, the data stream of the serialized encoded data 217a, 217b, . . . 217n of the chosen receiver 210a, 210b, . . . 210n is transferred to and retained within the data register 235. The de-interleave circuit 240 extracts the digital data with the included error correction codes from the data register 235 and rearranges the digital data to align the appropriate contiguous data segments are now placed correctly. The de-interleaved digital data is transferred to the error detection and correction circuit 245.

The error detection and correction circuit 245 evaluates the digital data for errors and if the data is correct or is correctable transfers the data 250 to external circuitry. If the data is not correctable, the ECC error signal 247 informs the diversity circuit that the data stream is corrupted and not correctable. The diversity circuit then searches the lock signals of each receiver 210a, 210b, . . . 210n to determine a next receiver having a lock signal. The diversity circuit then transfers the next data stream of serialized encoded data 217a, 217b, . . . 217n of the chosen receiver 210a, 210b, . . . 210n to the data register 235. The digital data is again de-interleaved by the de-interleave circuit 240 and examined for errors by the error detection circuit 245. If the data is not correctable, this process continues until an evaluation time period expires and the receiver 210a, 210b, . . . 210n having the valid lock signal is chosen to provide data 250 to the external circuitry.

Figure 9:
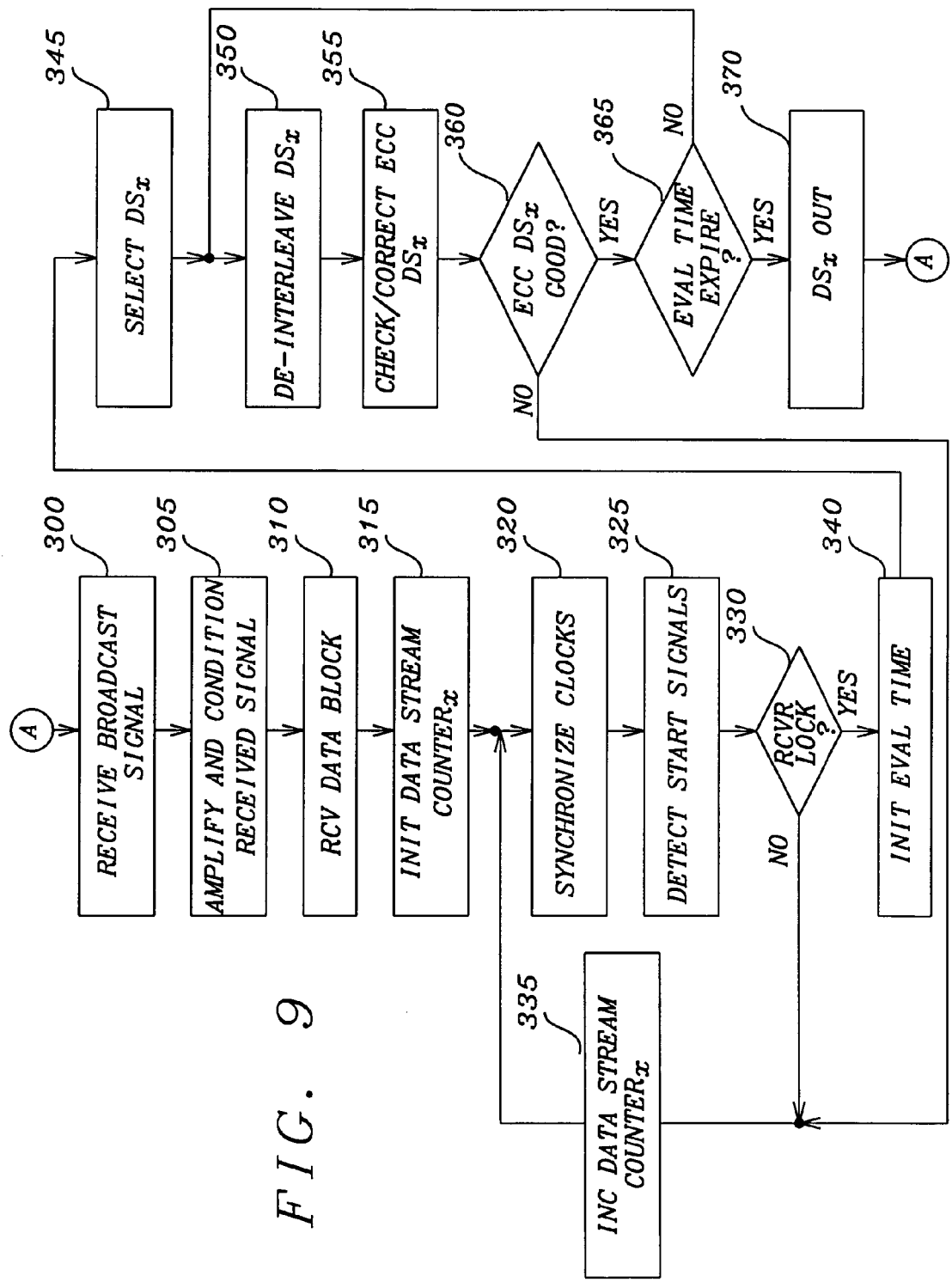
FIG. 9 is a flow chart of a first embodiment the method for receiving and recovering the encoded data of this invention.

As is known in the art, the diversity receiver 200 may include a digital signal processor. The digital signal processor, being a computing system, executes functions and processes being programs stored on data storage medium for execution by the method shown in FIG. 9. A group of receiving transducers, such as antennas or photodiodes, receive (Box 300) broadcast signals modulated with encoded data. The broadcast signals induce electrical signals in the receiving transducers that are conveyed to the digital signal processor. The digital signal processor will amplify and condition (Box 305) the electrical signal to extract the encoded data from each of the group of receiving transducer, which is received and retained (Box 310) for further processing. A data stream counter (x) is initialized (Box 315) to select one of the data streams of encoded data extracted from the broadcast signal from one of the receiving transducers. The data stream is examined to detect the clock synchronization signal to synchronize (Box 320) the receiving clock of the diversity receiver with the transmitted synchronization signal. The data stream is then examined to detect (Box 325) the start signal to indicate the beginning of the interleaved digital data with the included error correction codes. If the synchronization signal and the start signal are both detected (Boxes 320 and 325), the receiver is said to be locked. The receiver lock is then determined (Box 330). If the receiver is not locked, the data stream counter is incremented (Box 335) the next data stream indicated by the data stream counter is examined to determine if the data stream is locked (Boxes 320 and 325). The data stream counter is repetitively incremented (Box 335) and the data stream indicated by the data stream counter is examined for locking (Boxes 320 and 325) until a locking is determined.

Once the receiver is locked, an evaluation time period is initialized (Box 340) and the data stream of the encoded data from the receiver that achieved the data lock is selected (Box 345) for evaluation. The encoded data is rearranged to place the data segments in their appropriate contiguous order to de-interleave (Box 350) the encoded data. The selected encoded data is then checked for errors and if needed and if possible, the data is corrected (Box 355).

If the encoded data is determined (Box 360) to be uncorrectable, the data stream counter is incremented (Box 335) and the data stream indicated by the data stream counter is evaluated (Boxes 320 and 325) as locked. The data stream from the receiver selected pointed to by the data stream counter is evaluated (Box 355) for correct or correctable data until correct or correctable is determined (Box 360) to be present in the data stream of the encoded data. If the evaluation time is determined (Box 365) not to have expired, the remaining segments of the data stream are continually evaluated (Box 355) for correct or correctable data and the data stream selected by the data stream counter remains as the current data stream. When the evaluation time is determined (Box 365) to have expired, the data stream is transferred (Box 370) to external circuitry and the process begins again with the reception of the broadcast signal having the next frame of the encoded data.

Figure 10:
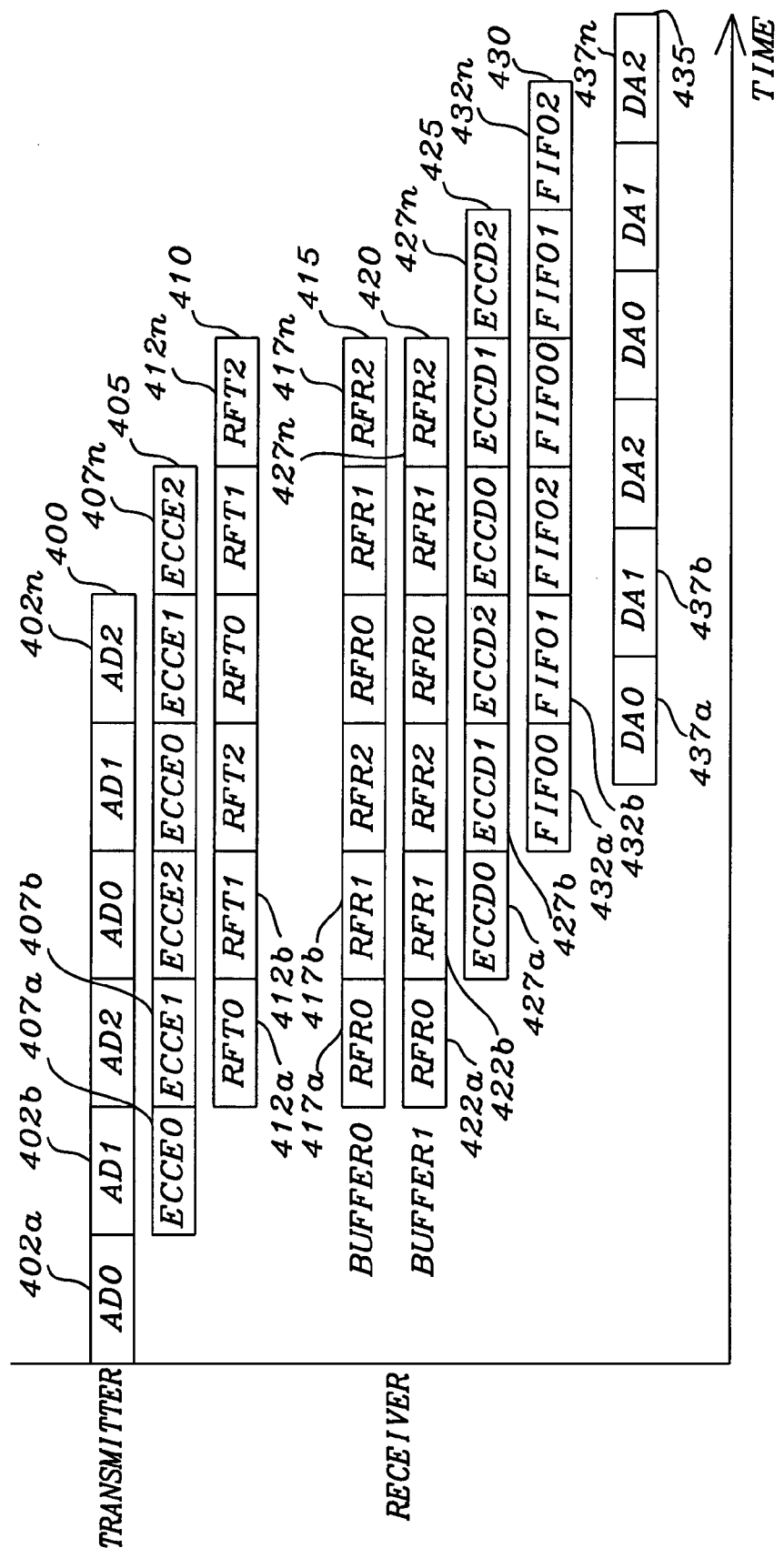
FIG. 10 is a timing diagram illustrating the transfer of the data from the transmitter to the receiver and employing receiver and buffer diversity to improve the quality of reception of the encoded data of this invention.

FIG. 10 illustrates the timing of the communication system of this invention. The communication system of this invention is structured to have a pipeline of frames 402a, 402b, . . . , 402n of the digital data 400 that is being transferred to the transmitter system. Each frame 402a, 402b, . . . , 402n of the digital data 400 has an error correction code generated and included within the frame 407a, 407b, . . . , 407n to form the frames of encoded data 405. The encoded data 405 has the synchronization and start signals appended for form the frames 412a, 412b, . . . , 412n transmit data 410. The transmit data 410 modulates a fundamental frequency (RF or Infrared), which is then radiated to the environment.

The radiated signal is received and extracted by multiple antennas and receivers and the frames 417a, 417b, . . . , 417n and 422a, 422b, . . . , 422n of received encoded data 415 and 420 is retained in multiple buffer circuits Buffer diversity basically refers to the instantiation of more than one set of receiving buffers to perform the acquisition task in parallel. In this case there are two antennas and receivers capturing the modulated signal with the encoded data. The data 415 and 420 extracted by the receiver is stored in the buffer circuits for further processing. The two Buffers contain the same data symbol stream 417a, 417b, . . . , 417n and 422a, 422b, . . . , 422n from the two different receiver units. Ideally these two buffers should contain the same data but in practice, interference will cause these two buffers to be corrupted differently.

The error detection and correction circuit 245 of FIG. 6 examines the data 417a, 417b, . . . , 417n and 422a, 422b, . . . , 422n sequentially to establish the integrity of the data symbols received. The error detection and correction circuit 245 determines if the first data stream 415 is correct or correctable. If the data is correct or correctable the data stream 415 is correct or correctable, the corrected frames 427a, 427b, . . . , 427n of the data stream 425 of the first buffer is stored as the frames 432a, 432b, . . . , 432n of the data stream 430 in a "first-in-first-out" register. The data frames 437a, 437b, . . . , 437n of data stream 435 are the transferred to external circuitry.

If however, the data stream 415 of the first buffer is not correctable, the frames 422a, 422a, . . . , 422a of the data stream 420 of the second buffer is evaluated for correct or correctable data. If the data is correct or correctable the data stream 420 is correct or correctable, the corrected frames 427a, 427b, . . . , 427n of the data stream 425 of the first buffer is stored as the frames 432a, 432b, . . . , 432n of the data stream 430 in a "first-in-first-out" register. The data frames 437a, 437b, . . . , 437n of data stream 435 are the transferred to external circuitry.

Figure 11:
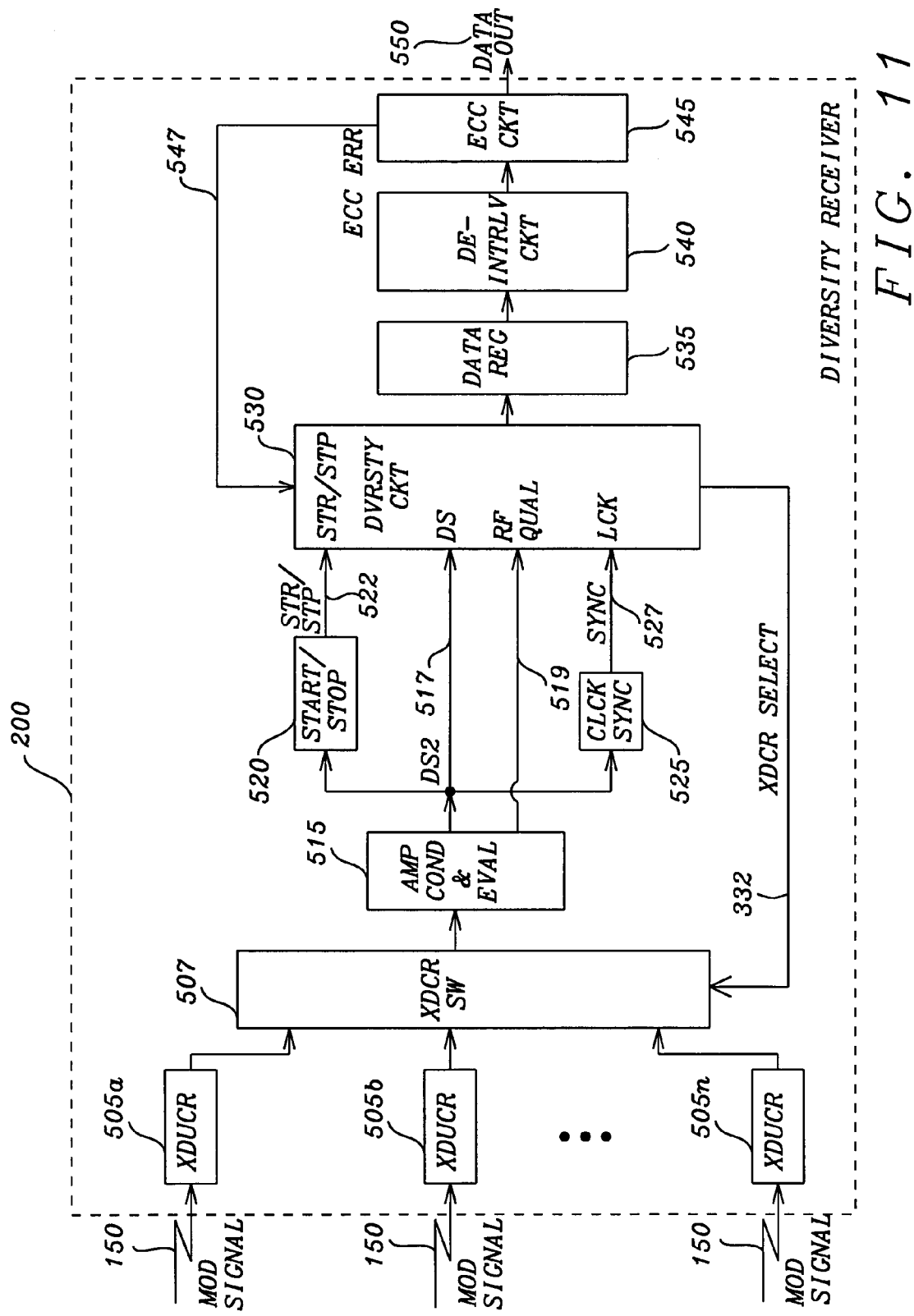
FIG. 11 is block diagram of a second embodiment of the diversity receiver of the communication system of this invention.

Refer to FIG. 11 for a discussion of the second embodiment of this invention. The modulated broadcast signal 150 is acquired by a number of transducers 505a, 505b, . . . , 505n. The transducers 505a, 505b, . . . 505n are placed such that as the modulated broadcast signal 150 may be fading causing an electrical signal developed by the transducers 505a, 505b, . . . 505n to vary with the intensity of the modulated broadcast signal 150. As described in FIGS. 1b and 5, the modulated broadcast signal 150 may be blocked by geographic obstacles such as mountains, hills or buildings. These blockages cause the phase and strength or intensity of the modulated broadcast signal 150 to vary as it arrives at each of the multiple transducers 505a, 505b, . . . 505n.

The electrical signals induced to the transducers 505a, 505b, . . . 505n are transferred to a transducer switch 507. The transducer switch 507 receives an transducer select line 532 which, based on a priority setting of the transducers, selects one of the multiple transducers 505a, 505b, . . . 505n. The electrical signal of the selected transducer of the multiple transducers 505a, 505b, . . . 505n is transferred through the transducer switch 507 to the amplification, conditioning, and evaluation circuit 515 within the receiver 510. The amplification, conditioning, and evaluation circuit 515 amplifies the electrical signal and removes the fundamental transmit signal from the electrical signal to extract the serialized encoded data. The amplification, conditioning, and evaluation circuit 515 further evaluates the characteristics of the electrical signal from the selected transducer of the multiple transducers 505a, 505b, . . . 505n to determine whether the quality of the electrical signal will allow the extraction of the serialized encoded data. The amplification, conditioning, and evaluation circuit 515 generates an RF quality signal 519 containing results of the evaluation of the characteristics of the electrical signal.

The serialized encoded data is transferred to the clock synchronization circuit 525, where the synchronization signal is detected and the receiver is synchronized to the frame clock 127 of FIG. 4. When the synchronization signal is detected, a synchronization locking signal 527 for the receiver 510 is generated indicating that the receiver 510 has achieved synchronization.

The serialized encoded data is also transferred to the start/stop circuit 520. The start/stop circuit 520 examines the serialized encoded data to detect the start signal within each frame of the encoded data. When the start signal is detected, the start/stop circuit 520 the receiver 510 provides a start signal 522 indicating the beginning of the interleaved digital data with the included error correction code. The combination of the synchronization locking signal 527 and the start signal 522 are combined to form the lock signal as described above.

Figure 13:
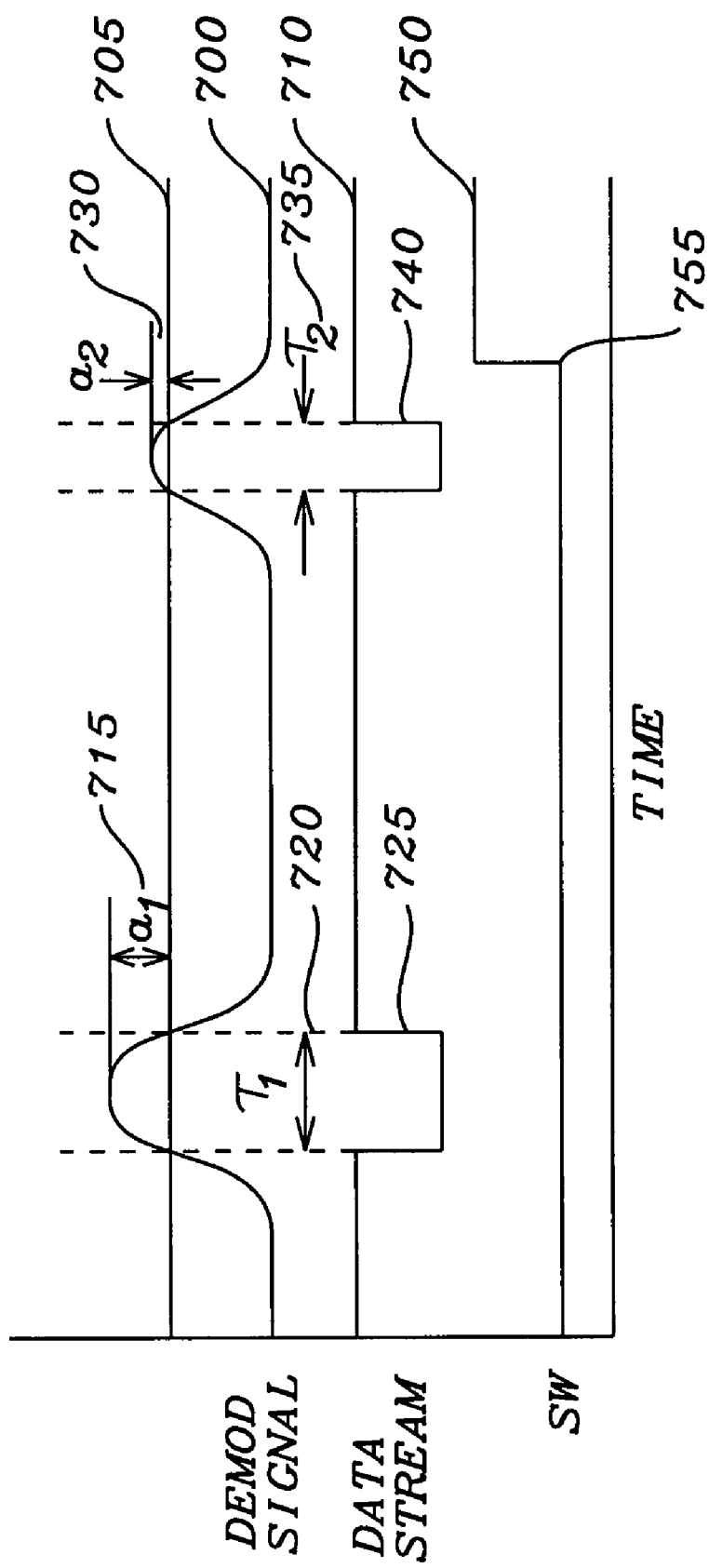
FIG. 13 is a timing diagram illustrating the evaluation of the signal characteristics to determine if a received electrical signal from a transducer of the second embodiment of the diversity receiver of this invention.

An example of the evaluation of the characteristics of the electrical signal from the selected transducer of the multiple transducers 505a, 505b, . . . 505n is shown in FIG. 13. The amplification, conditioning, and evaluation circuit 515 evaluates the amplitude of the demodulated electrical signal 700 from the selected transducer of the multiple transducers 505a, 505b, . . . 505n. The demodulation removing any fundamental frequency from induced electrical signal. The amplification, conditioning, and evaluation circuit 515 extracts the serialized encoded data by comparing the demodulated electrical signal 700 to a reference voltage level 705. If the amplitude 715 and 730 of the demodulated electrical signal 700 is greater than the reference voltage level 705, the serially encoded data stream 710 changes from a first logic level to a second logic level, as shown in the pulses 725 and 740. The pulse width 720 and 735 of the pulses 725 and 740 being determined by the amount of time that the demodulated electrical signal 700 remains at a voltage level greater than the reference voltage level 705.

If the amplitude 715 of the demodulated electrical signal 700 is greater than the reference voltage level 705 for period of time 720 such that the pulse width 725 of the serially encoded data stream 710 permits correct detection of the serially encoded data 710, the RF quality signal 519 indicates that the serialized encoded data 710 is adequate for reception. Alternately, if the amplitude 730 of the demodulated electrical signal 700 is not greater than the reference voltage level 705 for a period of time 735 sufficient to guarantee a pulse width 735 of the serially encoded data 710 that permits correct detection of the serially encoded data 710, the RF quality signal 519 indicates that the serialized encoded data 710 is not adequate for reception. If the RF quality signal 519 indicates that the serialized encoded data 710 is not adequate for reception, the transducer select signal 750 changes state 755 to select an alternate transducer.

Returning to FIG. 11, the data stream of the serialized encoded data 517, the RF quality signal 519, and the lock signal (synchronization locking signal 527 and start signal 522) for the receiver 510 are the input signals for the diversity circuit 530. The diversity circuit 530 determines that the electrical signal is of sufficient quality that the extracted serialized encoded data is valid and the receiver is synchronized to the transmitted synchronization locking signal and has detected the start signal. If the transducer having the highest priority value of the multiple transducers 505a, 505b, . . . 505n chosen does not have an electrical signal to guarantee a good extraction of the serialized encoded data or a lock signal, the priority value for the selected transducer is lowered. The diversity circuit 530 then reevaluates the priority of the multiple transducers 505a, 505b, . . . 505n and recodes the transducer select signal 532 to select a next of the multiple transducers 505a, 505b, . . . 505n with the highest priority value. The diversity circuit 530 selects each next highest priority transducer until a lock signal 527 is present.

Once the lock signal 522 is present at the receiver 510 and the receiver characteristic signal 522 indicates an adequate signal, the data stream of the serialized encoded data 517 of the receiver 510 is transferred to and retained within the data register 535. The de-interleave circuit 540 extracts the digital data with the included error correction codes from the data register 535 and rearranges the digital data to align the appropriate contiguous data segments are now placed correctly. The de-interleaved digital data is transferred to the error detection and correction circuit 545.

The error detection and correction circuit 545 evaluates the digital data for errors and if the data is correct or is correctable transfers the data 550 to external circuitry. If the data is not correctable, the ECC error signal 547 informs the diversity circuit that the data stream is corrupted and not correctable. The diversity circuit then lowers the priority value for the selected transducer. The diversity circuit the reevaluates the priority of the multiple transducers 505a, 505b, . . . 505n and recodes the transducer select signal 532 to select a next of the multiple transducers 505a, 505b, . . . 505n with the highest priority value. The diversity circuit 530 selects each next highest priority transducer until the data extracted from the electrical signal of the selected transducer is correct or correctable.

Figure 12:
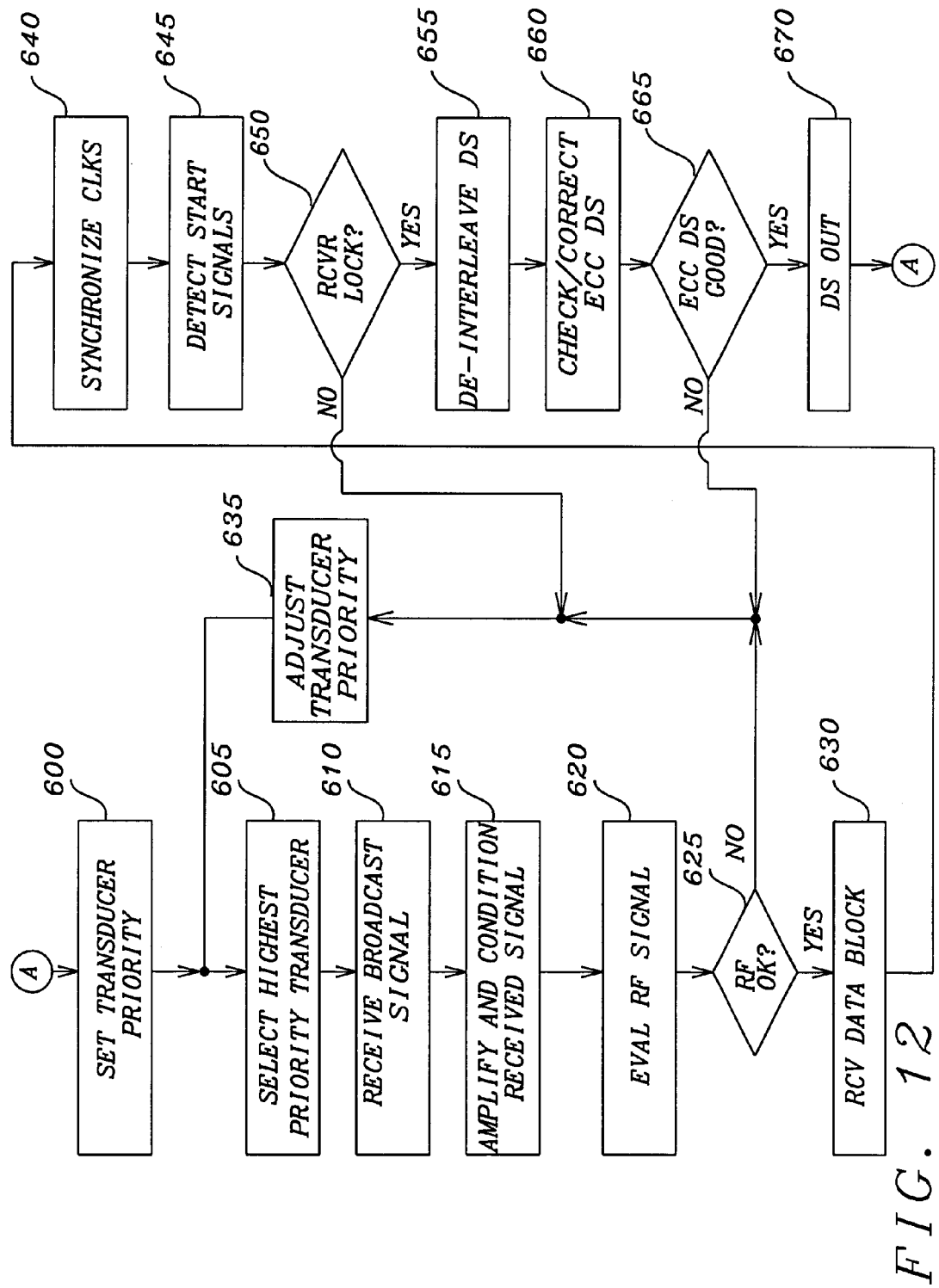
FIG. 12 is a flow chart of a second embodiment the method for receiving and recovering the encoded data of this invention.

As described above, the diversity receiver 200 may include a digital signal processor. The digital signal processor executing functions and processes being programs stored on data storage medium for executing the method shown in FIG. 12. A receiving transducer of a group of receiving transducers, such as antennas or photodiodes, has a transducer priority set (Box 600). The transducer having the highest priority is selected (Box 605) to receive (Box 610) broadcast signals modulated with encoded data. The broadcast signals induce electrical signals in the selected receiving transducer, which are conveyed to the digital signal processor. The digital signal processor will amplify and condition (Box 615) the electrical signal to extract the encoded data from each of the group of receiving transducers, which is received and retained for further processing. The electrical signal from the selected receiving transducer is further evaluated (Box 620) to determine if the characteristics such as the amplitude as described in FIG. 13 is sufficient to provide a correct data stream. The results of the evaluation (Box 620) is examined (Box 625) for suitability. If the electrical signal from the selected receiving transducer is not sufficient, the priority of the selected transducer is adjusted (Box 635) and the transducer with the next highest priority is then selected (Box 605) until an evaluation (Box 620) indicates that the electrical signal is sufficient to provide a correct serially encoded data stream. The serially encoded data stream is received (Box 630) and the data stream is examined (Box 640) to detect the clock synchronization signal to synchronize the receiving clock of the diversity receiver with the transmitted synchronization signal. The data stream is then examined to detect (Box 645) the start signal to indicate the beginning of the interleaved digital data with the included error correction codes. If the synchronization signal and the start signal are both detected (Boxes 640 and 645), the receiver is said to be locked. The receiver lock is then determined (Box 650). If the receiver is not locked, the priority of the selected transducer is adjusted (Box 635) and the transducer with the next highest priority is selected 605. The data stream counter is repetitively incremented (Box 635) and the data stream resulting from the next selected transducer is examined for locking (Boxes 620 and 625) until a locking is determined.

Once the receiver is locked, the encoded data is rearranged to place the data segments in their appropriate contiguous order to de-interleave (Box 655) the encoded data. The selected encoded data is then checked for errors and if needed and if possible, the data is corrected (Box 660).

If the encoded data is determined (Box 660) to be uncorrectable, the priority of the selected transducer is adjusted (Box 635) and the transducer with the next highest priority is selected 605. The data stream from the selected transducer is evaluated (Box 660) for correct or correctable data until correct or correctable is determined (Box 665) to be present in the data stream of the encoded data. The data stream is transferred (Box 670) to external circuitry and the process begins again with the reception of the broadcast signal having the next frame of the encoded data.

In the second embodiment of the invention, the switching of the transducer (antenna or photodiode) must be sufficiently fast that block of the received data are maintained. Maintaining of the blocks of the received data permits a continuity of the data. In an audio application, this continuity prevents unwanted noise or distortion of the audio stream.

Further the priority of the transducers permits the allowance for different losses for the multiple paths of the broadcast signals to the different transducers. A transducer having lower loss due to multiple path interference may be selected primarily over one with more loss.

While this invention has been particularly shown and described with reference to the preferred embodiments thereof, it will be understood by those skilled in the art that various changes in form and details may be made without departing from the spirit and scope of the invention.

The invention claimed is:

1. A diversity receiver system for receiving a coded data modulated signal from a transmission channel, said transmission channel characterized by multiple transmission paths having variable transmission time and variable attenuation characteristics causing multiple copies of said coded data modulated signal, wherein said diversity receiver system comprises:

a signal acquisition device in communication with the transmission channel for reception of said multiple copies of said coded data modulated signal, for evaluation of signal characteristics of one or more copies of said multiple copies of said coded data modulated signal, for extracting coded data, control signals, and locking signals from the one or more copies of said multiple copies of said coded data;

a diversity circuit in communication with the signal acquisition device to receive said signal characteristics and said coded data, said control signals, and locking signals, said diversity circuit selecting from said signal characteristics, said control signals, and said locking signals, one of said copies of said coded data modulated signal; and an error evaluation circuit in communication with the diversity circuit to receive the coded data from the selected copy of the coded data modulated signal, said error evaluation circuit evaluating said coded data signal for errors and providing an error signal to said diversity circuit indicating an error state of said selected data, wherein said diversity circuit selects a second copy of said coded data modulated signal.

2. The diversity receiver system of claim 1 wherein the signal acquisition device comprises:

a plurality of receiving transducers in communication with said transmission channel, each transducer acquiring one of said copies of the coded data modulated signal from said transmission channel and converting said copy of the coded data modulated signal to a received electrical signal, said received electrical signal varying in magnitude dependant upon the transmission time and variable attenuation characteristics of said transmission channel; and a plurality of receivers, each receiver in communication with one of said receiving transducers to amplify and condition said electrical signal and to extract said coded data, control signals, and locking signals from said received electrical signal.

3. The diversity receiver system of claim 2 wherein each of the plurality of the receiving transducers is assigned a selection priority such that the receiver in communication with a receiving transducer of a highest priority is selected by said diversity circuit.

4. The diversity receiver system of claim 2 wherein if said error signal indicates said selected data is in error, the diversity circuit determines another receiver having a valid locking signal and transfers the data of said receiver to the error evaluation circuit.

5. The diversity receiver system of claim 2 wherein if the error evaluation circuit indicates said selected data is in error but is correctable, said error evaluation circuit corrects said selected data.

6. The diversity receiver system of claim 2 further comprising a data register in communication with said diversity circuit to retain said selected data and in communication with the error evaluation circuit so that said error evaluation circuit can retrieve said selected data.

7. The diversity receiver system of claim 2 further comprising a de-interleaving circuit in communication with the diversity circuit to organize said selected data such that said selected data is in a contiguous order prior to transfer to said error evaluation circuit.

8. The diversity receiver system of claim 1 wherein the signal acquisition device comprises:

a plurality of receiving transducers in communication with said transmission channel, each transducer acquiring one of said copies of the coded data modulated signal from said transmission channel and converting said copy of the coded data modulated signal to a received electrical signal, said received electrical signal varying in magnitude dependant upon the transmission time and variable attenuation characteristics of said transmission channel;

an transducer switch in communication with the plurality of receiving transducers and in communication with the diversity circuit, which upon reception of a transducer selection signal from said diversity circuit selects one of said the electrical signals of a selected receiving transducer; and a receiver in communication with the transducer switch to amplify and condition said electrical signal from selected receiving transducer and to extract said coded data, control signals, and locking signals from said received electrical signal and in communication with the error evaluation circuit to transfer said coded data to the error evaluation circuit.

9. The diversity receiver system of claim 8 wherein each of the plurality of the receiving transducers is assigned a selection priority such that the receiving transducer of a highest priority is selected by said diversity circuit.

10. The diversity receiver system of claim 8 wherein if said error signal indicates said coded data received and extracted from the electrical signal of the selected receiving transducer is in error, the diversity circuit generates the transducer selection signal to select a second electrical signal from a second receiving transducer to be transferred to the receiver, said second electrical signal then having a valid locking signal and transfers the data of said receiver to the error evaluation circuit.

11. The diversity receiver system of claim 8 wherein if the error evaluation circuit indicates said coded data received and extracted from the electrical signal of the selected receiving transducer is in error but is correctable, said error evaluation circuit corrects said coded data received and extracted from the electrical signal of the selected receiving transducer.

12. The diversity receiver system of claim 8 further comprising a data register in communication with said diversity circuit to retain said coded data received and extracted from the electrical signal of the selected receiving transducer and in communication with the error evaluation circuit so that said error evaluation circuit can retrieve said coded data.

13. The diversity receiver system of claim 7 further comprising a de-interleaving circuit in communication with the diversity circuit to organize said selected data such that said coded data received and extracted from the electrical signal of the selected receiving transducer is in a contiguous order prior to transfer to said error evaluation circuit.

14. A method for receiving a coded data modulated signal from a transmission channel, said transmission channel characterized by multiple transmission paths having variable transmission times and variable attenuation characteristics causing multiple copies of said coded data modulated signal, said method for receiving the coded data modulated signal comprising the steps of:

a) acquiring the multiple copies of coded data modulated signal;

b) evaluating signal characteristics of one or more copies of said multiple copies of said coded data modulated signal;

c) extracting coded data, control signals, and locking signals from the one or more copies of said multiple copies of said coded data;

d) selecting one of said copies of said coded data modulated signal from said signal characteristics, said control signals, and said locking signals;

e) performing an error check and correction upon said coded data; and f) if the error check and correction is not able to correct said coded data, repeating steps d) and e) until a data block is successfully received.

15. The method of claim 14 wherein the step of extracting the coded data includes the step of rearranging the coded data such that data within said coded data is in contiguous order.

16. The method of claim 14 wherein creating the locking signal comprises the steps of:

detecting a synchronization signal within said coded data modulated signal;

synchronizing said receiver to said coded data modulated signal; and detecting the control signals indicative of a beginning of said plurality of data blocks within said coded data modulated signal.

17. The method of claim 14 wherein each copy of the multiple copies of the coded data modulated signal is assigned a selection priority such that selecting one of the multiple copies of the coded data modulated signal comprises the step of choosing the copy of the multiple copies of modulated coded data having a highest priority.

18. An apparatus for receiving a coded data modulated signal from a transmission channel, said transmission channel characterized by multiple transmission paths having variable transmission times and variable attenuation characteristics causing multiple copies of said coded data modulated signal, said apparatus for receiving the coded data modulated signal comprising:

a) means for acquiring the multiple copies of the coded data modulated signal;

b) means for evaluating signal characteristics of one or more copies of said multiple copies of said coded data modulated signal;

c) means for extracting coded data, control signals, and locking signals from the one or more copies of said multiple copies of said coded data;

d) means for selecting one of said copies of said coded data modulated signal from said signal characteristics, said control signals, and said locking signals;

e) means for performing an error check and correction upon said coded data; and f) means for repeatedly activating means d) and e) until a data block is successfully received, if the error check and correction is not able to correct said coded data.

19. The apparatus of claim 18 wherein the means for extracting the coded data includes means for rearranging the coded data such that data within said coded data is in contiguous order.

20. The apparatus of claim 18 wherein means for creating the locking signal comprises:

means for detecting a synchronization signal within said coded data modulated signal;

means for synchronizing said receiver to said coded data modulated signal; and means for detecting the control signals indicative of a beginning of said plurality of data blocks within said coded data modulated signal.

21. The apparatus of claim 18 wherein each copy of the multiple copies of the coded data modulated signal is assigned a selection priority such that means for selecting one of the multiple copies of the coded data modulated signal comprises means for choosing the copy of the multiple copies of modulated coded data having a highest priority.

22. An apparatus for receiving a coded data modulated signal from a transmission channel, said transmission channel characterized by multiple transmission paths having variable transmission time and variable attenuation characteristics causing multiple copies of said coded data modulated signal, said apparatus executing a process for receiving the coded data modulated signal comprising the steps of:

a) acquiring the multiple copies of coded data modulated signal;

b) evaluating signal characteristics of one or more copies of said multiple copies of said coded data modulated signal;

c) extracting coded data, control signals, and locking signals from the one or more copies of said multiple copies of said coded data;

d) selecting one of said copies of said coded data modulated signal from said signal characteristics, said control signals, and said locking signals;

e) performing an error check and correction upon said coded data; and f) if the error check and correction is not able to correct said coded data, repeating steps d) and e) until a data block is successfully received.

23. The apparatus of claim 22 wherein the step of extracting the coded data includes the step of rearranging the coded data such that data within said coded data is in contiguous order.

24. The apparatus of claim 22 wherein creating the locking signal comprises the steps of:

detecting a synchronization signal within said coded data modulated signal;

synchronizing said receiver to said coded data modulated signal; and detecting the control signals indicative of a beginning of said plurality of data blocks within said coded data modulated signal.

25. The apparatus of claim 22 wherein each copy of the multiple copies of the coded data modulated signal is assigned a selection priority such that selecting one of the multiple copies of the coded data modulated signal comprises the step of choosing the copy of the multiple copies of modulated coded data having a highest priority.

26. A diversity receiver system for receiving a broadcast signal modulated with coded data, having multiple transmission paths, said diversity receiver comprising:

a plurality of receiving transducers, each transducer acquiring said broadcast signal and converting said broadcast signal to a received electrical signal, said received electrical signal varying in magnitude dependant upon an intensity of said broadcast signal traversing said multiple transmission paths;

a plurality of receivers, each receiver in communication with one of said receiving transducers to amplify and condition said electrical signal and to extract data and locking signals from said received electrical signal;

a diversity circuit in communication with each of the plurality of receivers to receive said data and locking signals, said diversity circuit selecting one of the data signals from one of the plurality of receivers having a valid locking signal indicating said receiver is able to retrieve said coded data from the electrical signal; and an error evaluation circuit in communication with the diversity circuit to receive the selected data signal, said error evaluation circuit evaluating said selected data signal for errors and providing an error signal to said diversity circuit indicating an error state of said selected data.

27. The diversity receiver system of claim 26 wherein if said error signal indicates said selected data is in error, the diversity circuit determines another receiver having a valid locking signal and transfers the data of said receiver to the error evaluation circuit.

28. The diversity receiver system of claim 26 wherein if the error evaluation circuit indicates said selected data is in error but is correctable, said error evaluation circuit corrects said selected data.

29. The diversity receiver system of claim 26 further comprising a data register in communication with said diversity circuit to retain said selected data and in communication with the error evaluation circuit so that said error evaluation circuit can retrieve said selected data.

30. The diversity receiver system of claim 26 further comprising a de-interleaving circuit in communication with the diversity circuit to organize said selected data such that said selected data is in a contiguous order prior to transfer to said error evaluation circuit.

31. A method for receiving a broadcast signal modulated with coded data comprising the steps of:
   a) acquiring said broadcast signal at one of a plurality of receivers;
   b) creating a locking signal indicating said receiver has successfully acquired said broadcast signal;
   c) if said locking signal is not able to be created, repeating steps a) and b) until a locking signal is created indicating successful acquisition of said broadcast signal;
   d) extracting one data block of a plurality of data blocks of said coded data from said broadcast signal;
   e) performing an error check and correction upon said data block for eliminating errors from said data block;
   f) if the error check and correction is not able to correct said data block, repeating steps a) through e) until a data block is successfully received; and
   g) repeatedly performing said error check and correction until all remaining data blocks of said broadcast signal are extracted and successfully checked and corrected for errors.

32. The method of claim 31 wherein the step of extracting the data block includes the step of rearranging the data block such that data within said data block is in contiguous order.

33. The method of claim 31 wherein creating the locking signal comprises the steps of:
   detecting a synchronization signal within said broadcast signal;
   synchronizing said receiver to said broadcast signal; and
   detecting a start signal indicative of a beginning of said plurality of data blocks within said broadcast signal.

34. An apparatus for receiving a broadcast signal modulated with coded data comprising:
   a) means for acquiring said broadcast signal at one of a plurality of receivers;
   b) means for creating a locking signal indicating said receiver has successfully acquired said broadcast signal;
   c) means for activating the means of a) and b) until a locking signal is created indicating successful acquisition of said broadcast signal, if said locking signal is able to be created;
   d) means for extracting one data block of a plurality of data blocks from said broadcast signal;
   e) means for performing an error check and correction upon said data block for eliminating errors from said data block
   f) means for activating the means of a) through e) until a data block is successfully received, if the error check and correction is not able to correct said data block; and
   g) means for repeatedly performing said error check and correction until all remaining data blocks of said broadcast signal are extracted and successfully checked and corrected for errors.

35. The apparatus of claim 34 wherein the means for extracting the data block includes means for rearranging the data block such that data within said data block is in contiguous order.

36. The apparatus of claim 34 wherein means for creating the locking signal comprises:
   means for detecting a synchronization signal within said broadcast signal;
   means for synchronizing said receiver to said broadcast signal; and
   means for detecting a start signal indicative of a beginning of said plurality of data blocks within said broadcast signal.

37. An apparatus for acquiring coded data from a plurality of receiving transducers, each receiver in communication with one of a plurality receiving transducers to amplify and condition an electrical signal acquired by said receiving transducers and extract said coded data and locking signals from said received electrical signal, each receiving transducer acquiring a broadcast signal and converting said broadcast signal to said received electrical signal, said received electrical signal varying in magnitude dependant upon an intensity of said broadcast signal, said apparatus executing a program comprising the steps of:
   a) selecting one of said plurality of receivers;
   b) detecting said locking signal indicating said receiver has successfully acquired said broadcast signal;
   c) if said locking signal is not able to be created by said, repeating steps a) and b) until a locking signal is created indicating successful acquisition of said broadcast signal;
   d) extracting one data block of a plurality of data blocks of said coded data from said electrical signal;
   e) performing an error check and correction upon said data block for eliminating errors from said data block;
   f) if the error check and correction is not able to correct said data block, repeating steps a) through e) until a data block is successfully received; and
   g) repeatedly performing said error check and correction until all remaining data blocks of said electrical signal are extracted and successfully checked and corrected for errors.

38. The apparatus of claim 37 wherein the step of extracting the data block includes the step of rearranging the data block such that data within said data block is in contiguous order.

39. The apparatus of claim 37 wherein creating the locking signal comprises the steps of:
   detecting a synchronization signal within said broadcast signal;
   synchronizing said receiver to said broadcast signal; and
   detecting a start signal indicative of a beginning of said plurality of data blocks within said broadcast signal.

40. A diversity receiver system for receiving a coded data modulated signal from a transmission channel, said transmission channel characterized by multiple transmission paths having variable transmission time and variable attenuation characteristics causing multiple copies of said coded data modulated signal, wherein said diversity receiver system comprises:

a plurality of receiving transducers in communication with said transmission channel, each transducer acquiring one of said copies of the coded data modulated signal from said transmission channel and converting said copy of the coded data modulated signal to a received electrical signal, said received electrical signal varying in magnitude dependant upon the transmission time and variable attenuation characteristics of said transmission channel;

a transducer switch in communication with the plurality of receiving transducers, which upon reception of a transducer selection signal selects one of said the electrical signals of a selected receiving transducer;

a receiver in communication with the transducer switch to amplify and condition said electrical signal from a selected receiving transducer and to extract said coded data, control signals, and locking signals from said received electrical signal.

a diversity circuit in communication with the receiver to receive said signal characteristics and said coded data, said control signals, and locking signals, and in communication with the transducer switch, said diversity circuit selecting from said signal characteristics, said control signals, and said locking signals, generates the transducer selection signal designating one of said copies of said coded data modulated signal; and an error evaluation circuit in communication with the receiver to receive the coded data from the selected copy of the coded data modulated signal, said error evaluation circuit evaluating said coded data signal for errors and providing an error signal to said diversity circuit indicating an error state of said selected data, wherein said diversity circuit generates a second transducer selection signal to select a second copy of said coded data modulated signal.

41. The diversity receiver system of claim 40 wherein each of the plurality of the receiving transducers is assigned a selection priority such that the receiving transducer of a highest priority is selected by said diversity circuit.

42. The diversity receiver system of claim 40 wherein if said error signal indicates said coded data received and extracted from the electrical signal of the selected receiving transducer is in error, the diversity circuit generates the transducer selection signal to select a second electrical signal from a second receiving transducer to be transferred to the receiver, said second electrical signal then having a valid locking signal and transfers the data of said receiver to the error evaluation circuit.

43. The diversity receiver system of claim 40 wherein if the error evaluation circuit indicates said coded data received and extracted from the electrical signal of the selected receiving transducer is in error but is correctable, said error evaluation circuit corrects said coded data received and extracted from the electrical signal of the selected receiving transducer.

44. The diversity receiver system of claim 40 further comprising a data register in communication with said diversity circuit to retain said coded data received and extracted from the electrical signal of the selected receiving transducer and in communication with the error evaluation circuit so that said error evaluation circuit can retrieve said coded data.

45. The diversity receiver system of claim 40 further comprising a de-interleaving circuit in communication with the diversity circuit to organize said selected data such that said coded data received and extracted from the electrical signal of the selected receiving transducer is in a contiguous order prior to transfer to said error evaluation circuit.

46. A method for receiving a coded data modulated signal from a transmission channel, said transmission channel characterized by multiple transmission paths having variable transmission time and variable attenuation characteristics causing multiple copies of said coded data modulated signal, said method for receiving the coded data modulated signal comprising the steps of:

a) setting a priority value for each of a plurality of receiving transducers, said plurality of receiving transducers in communication with the transmission channel such that said receiving transducers convert one of the copies of the coded data modulated signal to a received electrical signal;

b) selecting one of the plurality of receiving transducers having a highest priority;

c) evaluating signal characteristics of said received electrical signal from the one receiving transducer having the highest priority;

d) extracting coded data, control signals, and locking signals from the received electrical signal from the one receiving transducer having the highest priority;

e) performing an error check and correction upon said coded data;

f) if the signal characteristics, control signals, locking signals, and results of said error check and correction indicate that the received electrical signal is not adequate for reconstruction of coded data from said received electrical signal, adjusting said priority value of said receiving transducer to a lower priority; and g) repeating steps d) through f) until said coded data is successfully received.

47. The method of claim 46 wherein the step of extracting the coded data includes the step of rearranging the coded data such that data within said coded data is in contiguous order.

48. The method of claim 46 wherein extracting the control signals and the locking signal comprises the steps of:

detecting a synchronization signal within said coded data modulated signal;

synchronizing said receiver to said coded data modulated signal; and detecting the control signals indicative of a beginning of said plurality of data blocks within said coded data modulated signal.

49. An apparatus for receiving a coded data modulated signal from a transmission channel, said transmission channel characterized by multiple transmission paths having variable transmission time and variable attenuation characteristics causing multiple copies of said coded data modulated signal, said apparatus for receiving the coded data modulated signal comprising:

a) means for setting a priority value for each of a plurality of receiving transducers, said plurality of receiving transducers in communication with the transmission channel such that said receiving transducers convert one of the copies of the coded data modulated signal to a received electrical signal;

b) means for selecting one of the plurality of receiving transducers having a highest priority;

c) means for evaluating signal characteristics of said received electrical signal from the one receiving transducer having the highest priority;

d) means for extracting coded data, control signals, and locking signals from the received electrical signal from the one receiving transducer having the highest priority;
e) means for performing an error check and correction upon said coded data;
f) means for adjusting said priority value of said receiving transducer to a lower priority, if the signal characteristics, control signals, locking signals, and results of said error check and correction indicate that the received electrical signal is not adequate for reconstruction of coded data from said received electrical signal; and
g) means for repeatedly activating means of d) through f) until said coded data is successfully received.

50. The apparatus of claim 49 wherein the means for extracting the coded data includes the step of rearranging the coded data such that data within said coded data is in contiguous order.

51. The apparatus of claim 49 wherein means for extracting the control signals and the locking signal comprises the:
means for detecting a synchronization signal within said coded data modulated signal;
means for synchronizing said receiver to said coded data modulated signal; and
means for detecting the control signals indicative of a beginning of said plurality of data blocks within said coded data modulated signal.

52. An apparatus for receiving a coded data modulated signal from a transmission channel, said transmission channel characterized by multiple transmission paths having variable transmission time and variable attenuation characteristics causing multiple copies of said coded data modulated signal, said apparatus for receiving the coded data modulated signal executing a process comprising the steps of:
a) setting a priority value for each of a plurality of receiving transducers, said plurality of receiving transducers in communication with the transmission channel such that said receiving transducers convert one of the copies of the coded data modulated signal to a received electrical signal;
b) selecting one of the plurality of receiving transducers having a highest priority;
c) evaluating signal characteristics of said received electrical signal from the one receiving transducer having the highest priority;
d) extracting coded data, control signals, and locking signals from the received electrical signal from the one receiving transducer having the highest priority;
e) performing an error check and correction upon said coded data;
f) if the signal characteristics, control signals, locking signals, and results of said error check and correction indicate that the received electrical signal is not adequate for reconstruction of coded data from said received electrical signal, adjusting said priority value of said receiving transducer to a lower priority; and
g) repeating steps d) through f) until said coded data is successfully received.

53. The apparatus of claim 52 wherein the step of extracting the coded data includes the step of rearranging the coded data such that data within said coded data is in contiguous order.

54. The apparatus of claim 52 wherein extracting the control signals and the locking signal comprises the steps of:
detecting a synchronization signal within said coded data modulated signal;
synchronizing said receiver to said coded data modulated signal; and
detecting the control signals indicative of a beginning of said plurality of data blocks within said coded data modulated signal.

* * * * *